(12) United States Patent
Kim et al.

(10) Patent No.: US 11,955,027 B2
(45) Date of Patent: Apr. 9, 2024

(54) INFORMATION OUTPUT APPARATUS AND METHOD

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 1201 days.

(21) Appl. No.: 16/494,603

(22) PCT Filed: Jun. 15, 2018

(86) PCT No.: PCT/KR2018/006754
§ 371 (c)(1),
(2) Date: Sep. 16, 2019

(87) PCT Pub. No.: WO2018/230986
PCT Pub. Date: Dec. 20, 2018

(65) Prior Publication Data
US 2020/0090547 A1  Mar. 19, 2020

(30) Foreign Application Priority Data

Jun. 15, 2017 (KR) .................. 10-2017-0075814

(51) Int. Cl.
*G09B 21/00* (2006.01)
*G06F 3/01* (2006.01)
(Continued)

(52) U.S. Cl.
CPC ........... *G09B 21/003* (2013.01); *G06F 3/016* (2013.01); *G06F 3/04886* (2013.01);
(Continued)

(58) Field of Classification Search
None
See application file for complete search history.

(56) References Cited

U.S. PATENT DOCUMENTS

2002/0003469 A1* 1/2002 Gupta ................. H04M 1/2476
340/407.1
2012/0319981 A1* 12/2012 Habas .................. G09B 21/008
345/173

FOREIGN PATENT DOCUMENTS

CN  104965922 A  10/2015
CN  106846991 A  6/2017
(Continued)

*Primary Examiner* — James B Hull
(74) *Attorney, Agent, or Firm* — NKL LAW; Jae Youn Kim

(57) ABSTRACT

Provided is an information output apparatus and method. The information output apparatus includes a plurality of expression members configured to protrude or retract by moving in at least one direction and being sensed by a user when protruding or retracting; an activation area calculator configured to calculate a series of braille letters as an activation area on the plurality of expression members; a non-activation area calculator configured to calculate a space between the braille letters as a non-activation area in the activation area; and a plurality of actuation controllers configured to actuate expression members corresponding to the activation area to protrude or retract and configured to actuate expression members corresponding to the non-activation area to retract.

13 Claims, 20 Drawing Sheets

(51) Int. Cl.
*G06F 3/04886* (2022.01)
*G09B 21/02* (2006.01)
*H04M 1/247* (2021.01)
*H04M 1/72475* (2021.01)
*H04M 1/72481* (2021.01)

(52) U.S. Cl.
CPC ......... *G09B 21/004* (2013.01); *G09B 21/008* (2013.01); *G09B 21/02* (2013.01); *H04M 1/2476* (2013.01); *H04M 1/72475* (2021.01); *H04M 1/72481* (2021.01)

(56) References Cited

FOREIGN PATENT DOCUMENTS

| | | |
|---|---|---|
| KR | 10-2009-0038656 A | 4/2009 |
| KR | 10-2012-0020641 A | 3/2012 |
| KR | 10-1445706 B1 | 10/2014 |
| KR | 10-1677215 B1 | 11/2016 |
| KR | 10-2017-0066029 A | 6/2017 |
| WO | 2012-169810 A2 | 12/2012 |

\* cited by examiner

INFORMATION OUTPUT APPARATUS AND METHOD

TECHNICAL FIELD

The present disclosure relates to an information output apparatus and method.

BACKGROUND ART

With the recent remarkable growth in development of smart devices such as smart phones, smart watches, and smart glasses, people are provided with a convenient environment in everyday lives. However, most smart devices are based on a visual graphical user interface (GUI), and it is hard for visually impaired people to use these smart devices since it is hard for them to recognize a mouse pointer or a touch location. Therefore, a user interface for transmitting information using sound or tactile sensation is clearly needed to enable visually impaired people to use smart devices.

Information disclosed in this Background section was already known to the inventors of the present disclosure before achieving the present disclosure or is technical information acquired in the process of achieving the present disclosure. Therefore, it may contain information that does not form the prior art that is already known to the public in this country.

Prior Art Document 1: Korean Application Publication 2012-0020641

DESCRIPTION OF EMBODIMENTS

Technical Problem

Embodiments are provided to increase an information recognition rate by allowing a user to easily identify diverse information output through an information output apparatus.

Embodiments are also provided to allow actuators in an information output apparatus to have a uniform life.

Solution to Problem

According to an aspect of the present disclosure, an information output apparatus includes: a plurality of expression members configured to protrude or retract by moving in at least one direction and being sensed by a user when protruding or retracting; an activation area calculator configured to calculate a series of braille letters as an activation area on the plurality of expression members; a non-activation area calculator configured to calculate a space between the braille letters as a non-activation area in the activation area; and a plurality of actuation controllers configured to actuate expression members corresponding to the activation area among the plurality of expression members to protrude or retract and configured to actuate expression members corresponding to the non-activation area among the plurality of expression members to retract.

The information output apparatus may further include an output object selector configured to select, as an output object, one of externally received information, information stored in the information output apparatus, and/or information generated in the information output apparatus and configured to output the output object to the plurality of expression members.

The information output apparatus may further include an output mode determinator configured to determine one of first through third information output modes as an output mode for the output object selected by the output object selector.

The information output apparatus may further include a processor configured to map the output object corresponding to the output mode determined by the output mode determinator to the plurality of expression members.

The information output apparatus may further include a plurality of actuators respectively connected to the plurality of expression members and configured to respectively actuate the plurality of expression members to protrude or retract under control of the plurality of actuation controllers.

According to another aspect of the present disclosure, an information output method includes: calculating a series of braille letters as an activation area on a plurality of expression members protruding or retracting by moving in at least one direction and being sensed by a user when protruding or retracting; calculating a space between the braille letters as a non-activation area in the activation area; and actuating expression members corresponding to the activation area among the plurality of expression members to protrude or retract and actuating expression members corresponding to the non-activation area among the plurality of expression members to retract.

The information output method may further include selecting, as an output object, one of externally received information, information stored in an information output apparatus, and/or information generated in the information output apparatus and outputting the output object to the plurality of expression members.

The information output method may further include determining one of first through third information output modes as an output mode for the output object selected by an output object selector.

The information output method may further include mapping the output object corresponding to the output mode determined by an output mode determinator to the plurality of expression members.

Other aspects, features, and advantages than those described above will be clear from the accompanying drawings, the claims, and the description of embodiments below.

Advantageous Effects of Disclosure

According to embodiments, an information recognition rate, at which a user recognizes image information output in an information output apparatus, may be increased.

In addition, an information recognition rate, at which a user recognizes braille information output in an information output apparatus, may be increased.

An information recognition rate, at which a user recognizes each of image information and braille information simultaneously output in an information output apparatus, may be increased.

Furthermore, actuators respectively corresponding to an activation area and a non-activation area may have a uniform life by shifting the activation area, which includes image information and/or braille information output in an information output apparatus, and the non-activation area, which distinguishes the image information and/or the braille information, in a certain direction.

Advantageous effects of the present disclosure are not limited to those mentioned above, and other advantageous effects that have not been mentioned will be clearly understood by one of skill in the art from the description below.

MODE OF DISCLOSURE

Figure 1:
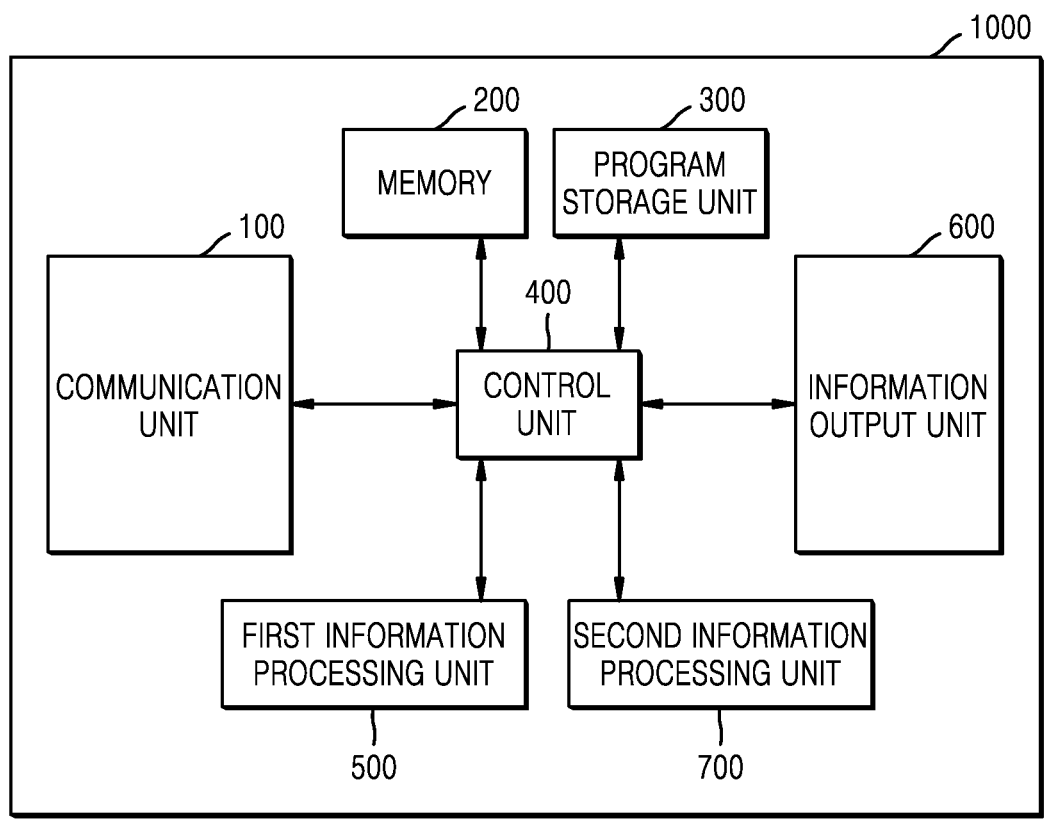
FIG. 1 is a schematic diagram of an information output apparatus according to an embodiment.

Advantages, features, and methods for achieving the effects and features will become more apparent by explaining the embodiments in detail with reference to the accompanying drawings. However, the present disclosure is not limited to these embodiments but may be implemented in various modes, and it is to be appreciated that all changes, equivalents, and substitutes that do not depart from the spirit and technical scope of the inventive concept are encompassed in embodiments. Rather, these embodiments are provided so that this disclosure will be thorough and complete, and will fully convey the scope of the embodiments to one of ordinary skill in the art. In the description of embodiments certain detailed explanations of the related art are omitted when it is deemed that they may unnecessarily obscure the essence of the present disclosure.

The terms used in the present application are merely used to describe example embodiments and are not intended to limit embodiments. An expression used in the singular encompasses the expression of the plural, unless it has a clearly different meaning in the context. In the present application, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms "first," "second," etc., may be used to describe various components, such components must not be limited to the above terms. The above terms are used only to distinguish one component from another.

The embodiments of the present disclosure will now be described in detail with reference to the accompanying drawings, in which like reference numerals denote like elements, and thus their description will be omitted.

FIG. 1 is a schematic diagram of an information output apparatus according to an embodiment. Referring to FIG. 1, an information output apparatus 1000 may include a communication unit 100, a memory 200, a program storage unit 300, a control unit 400, a first information processing unit 500, an information output unit 600, and a second information processing unit 700.

The communication unit 100 may transmit a signal between an external device (e.g., an information providing system, a server, or another information output device) and the information output apparatus 1000 in association with a communication network and may provide a communication interface needed to provide a transmission/reception signal in a form of packet data. Furthermore, the communication unit 100 may receive a certain information request signal from the information output apparatus 1000 and transmit information processed by the information output apparatus 1000 to outside the information output apparatus 1000. Here, the communication network is a medium connecting an external device to the information output apparatus 1000 and may include a channel providing an access route such that the information output apparatus 1000 may transmit and receive data after accessing the external device. Examples of the communication network may include wired networks such as local area networks (LANs), wide area networks (WANs), metropolitan area networks (MANs), and integrated service digital networks (ISDNs) and wireless networks such as wireless LANs, code division multiple access (CDMA), Bluetooth, and satellite communications, but the scope of the present disclosure is not limited thereto. The communication unit 100 may be a device that includes hardware or software needed to transmit and receive signals, such as control signals or data signals, to and from another network device via a wired or wireless connection.

The memory 200 may temporarily or permanently store information processed by the control unit 400 and/or information externally received through the communication unit 100. Here, the memory 200 may include a magnetic storage medium or a flash storage medium, but the scope of the present disclosure is not limited thereto.

The program storage unit 300 may be equipped with control software that performs a task of selecting an output object to be output in the information output apparatus 1000, a task of determining an output mode, a task of processing information according to the determined output mode, a task of calculating an output position of the processed information in the information output apparatus 1000, a task of controlling actuation of an expression member (630 in FIGS. 8 through 13) according to the output position, a task of calculating an operating time of the information output apparatus 1000, a task of calculating an actuation time and/or an operation count of the expression member, a task of shifting an actuation position of the expression member in a certain direction and so on.

The control unit 400 is a kind of a central processing unit and may control the entire procedure for processing information and outputting an information processing result in the information output apparatus 1000 in conjunction with the program storage unit 300 when the information output apparatus 1000 accesses an external device and receives an information request signal or internally generates information.

In this embodiment, the control unit 400 may include any type of device like a processor that is capable of processing random information. Here, a "processor" may, for example, refer to a data processing device that is built in hardware and includes a circuit physically structured to perform a function represented by code or instructions contained in a program. Examples of a data processing device built in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The first information processing unit 500 may process information externally received through the communication unit 100, information stored in the memory 200, and/or internally generated information (e.g., text message information produced in the information output apparatus 1000) to be output in the information output apparatus 1000. In this embodiment, "information" may include image information and/or braille information, and the image information may include a still cut such as a photograph, a cartoon, or a picture, a moving image, and/or a series of texts.

The first information processing unit 500 may select an output object from image information and/or braille information, determine an information output mode for the selected output object, perform information processing on the output object according to the determined information output mode, and calculate an activation area and a non-activation area. In this embodiment, calculation of an activation area or a non-activation area may refer to calculation of an actuated (protrusion or retraction) position of an expression member in the information output apparatus 1000.

The information output unit 600 may actuate each of expression members respectively corresponding to a position of the activation area and a position of the non-activation area, which are calculated by the first information processing unit 500, to protrude and/or retract such that a user may perceive the expression members using tactile sensation.

The second information processing unit 700 may shift the activation area and the non-activation area in a certain direction after a certain time period elapses. Here, the certain time period may include at least one selected from an absolute time, an operating time of the information output apparatus 1000, and a protruding or retracting actuation time of an expression member positioned in an activation area. In addition, the certain direction may include a horizontal direction shifting by at least one column or a vertical direction shifting by at least one row. As described above, the certain direction may further include the number of columns and/or the number of rows, that is, the amount of shift, together with a direction.

In an optional embodiment, the second information processing unit 700 may shift an activation area and a non-activation area in the certain direction when a certain frequency is exceeded. Here, the certain frequency may include the frequency of protrusions and retractions of an expression member in the activation area.

In an optional embodiment, the second information processing unit 700 may shift an activation area and a non-activation area in the certain direction when a shift request signal is received from a user. Here, the user may select a shift direction, and when the user does not select the shift direction, a programmed shift direction may be selected.

As described above, when the second information processing unit 700 shifts an activation area and a non-activation area in a certain direction, actuators actuating an expression member may have a uniform life.

Figure 2:
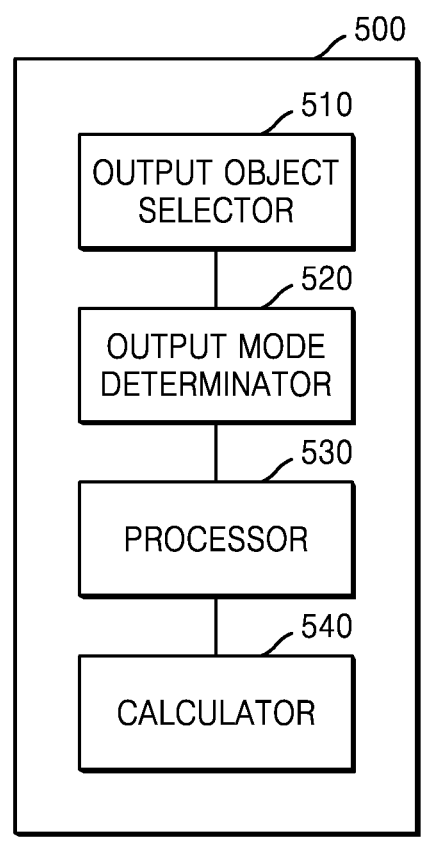
FIG. 2 is a schematic diagram of the detailed configuration of a first information processing unit in the information output apparatus of FIG. 1.

FIG. 2 is a schematic diagram of the detailed configuration of the first information processing unit 500 in the information output apparatus 1000 of FIG. 1. Referring to FIG. 2, the first information processing unit 500 may include an output object selector 510, an output mode determinator 520, and a calculator 540.

The output object selector 510 may select an output object to be output in the information output apparatus 1000 from information externally received through the communication unit 100, information stored in the memory 200, and/or internally generated information. To select an output object, the output object selector 510 may ask a user which information is determined as the output object and select the output object, i.e., image information or braille information or mixed information including image information and braille information, in response to the user's choice.

In an embodiment, the output object selector 510 may select an output object in time order. For example, when there are braille information externally received through the communication unit 100 and image information stored in the memory 200 and the braille information externally received through the communication unit 100 is earliest, the output object selector 510 may select the braille information externally received through the communication unit 100 as the output object. In another embodiment, the output object selector 510 may select an output object according to priority predetermined by a user. For example, when braille information is set to have priority over image information and mixed information, the output object selector 510 may select, as the output object, braille information among information externally received through the communication unit 100, information stored in the memory 200, and/or internally generated information.

The output mode determinator 520 may determine an information output mode for the output object selected by the output object selector 510. The output mode determinator 520 may classify the information output mode into three modes including an image information output mode as a first information output mode, a braille information output mode as a second information output mode, and a mixed information output mode (i.e., an image and braille information output mode) as a third information output mode. The information output mode is classified as described above since an output method is different according to the type of information. The image information output mode as the first information output mode may include a mode in which only image information is output in the information output apparatus 1000. The braille information output mode as the second information output mode may include a mode in which only braille information is output in the information output apparatus 1000. The mixed information output mode as the third information output mode may include a mode in which a display area of the information output apparatus 1000 is divided into at least two display areas and different types of information are output to the respective display areas.

The processor 530 may perform information processing for information output according to the determined output mode. In the image information output mode as the first information output mode, the processor 530 may divide image information to be output into a foreground area and a background area and map the foreground area and the background area to a plurality of expression members in the information output apparatus 1000. In the braille information output mode as the second information output mode, the processor 530 may map braille information to be output to the expression members in the information output apparatus 1000. In this embodiment, text information may be converted into braille information, and the braille information may be mapped to the expression members in the information output apparatus 1000. In this case, the processor 530 may further include a function of converting text information into braille information. In the mixed information output mode as the third information output mode, the processor 530 may divide the display area of the information output apparatus 1000 into at least two sections and map image information and braille information, each to be output, to expression members in the display areas.

The calculator 540 may calculate an activation area and a non-activation area with respect to output members in the information output apparatus 1000 in response to an information processing result of the processor 530. In this embodiment, the activation area may include an area in which an expression member is dynamically actuated to protrude or retract, and the non-activation area may include an area in which an expression member is not dynamically actuated to protrude and/or retract but remains retracted until an output mode ends. Here, remaining retracted may vary with an output mode. At least one expression member may be maintained retracted in one output mode and may be actuated to protrude or retract in another mode. Accordingly, in this embodiment, the calculation of an activation area may include calculating a protrusion actuated position or a retraction actuated position of an expression member, and the calculation of a non-activation area may include calculating a position at which retraction is maintained for an expression member.

In the image information output mode as the first information output mode, the calculator 540 may calculate a first activation area and a second activation area from a result of mapping image information to be output to a plurality of expression members in the information output apparatus 1000. In the image information output mode as the first information output mode, the calculation of the first activation area may include calculating a protrusion actuated position of an expression member for a foreground area of the image information and the calculation of the second activation area may include calculating a retraction actuated position of an expression member for a background area of the image information, and vice versa. Accordingly, it may be seen that there is no non-activation area in the image information output mode as the first information output mode.

In the braille information output mode as the second information output mode, the calculator 540 may calculate an activation area and a non-activation area from a result of mapping braille information to be output to a plurality of expression members in the information output apparatus 1000. In the braille information output mode as the second information output mode, the calculation of the activation area may include calculating a protrusion and/or retraction actuated position of an expression member for the braille information and the calculation of the non-activation area may include calculating a retraction maintained position of an expression member, for which retraction is maintained, in at least one selected from the space between braille columns, the space between braille rows, and the space between braille paragraphs in the activation area.

In the mixed information output mode as the third information output mode, the calculator 540 may calculate a first activation area and a second activation area with respect to a result of mapping image information to be output to a plurality of expression members in the information output apparatus 1000 and calculate an activation area and a non-activation area with respect to a result of mapping braille information to be output to a plurality of expression members in the information output apparatus 1000.

Figure 3:
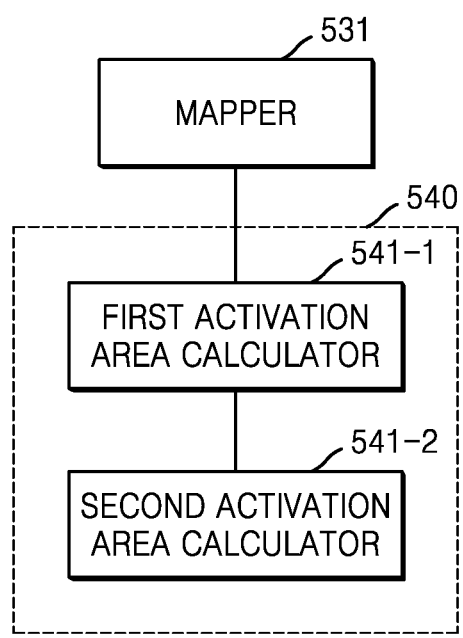
FIG. 3 is a schematic diagram of the detailed configuration of a processor and a calculator in the first information processing unit of FIG. 2, according to an embodiment.

FIG. 3 is a schematic diagram of the detailed configuration of the processor 530 and the calculator 540 in the first information processing unit 500 of FIG. 2, according to an embodiment. Referring to FIG. 3, the processor 530 may include a mapper 531, and the calculator 540 may include a first activation area calculator 541-1 and a second activation area calculator 541-2. Accordingly, it may be said that FIG. 3 is a diagram for explaining information processing and calculation in the image information output mode as the first information output mode.

The mapper 531 may map image information to be output to a plurality of expression members in the information output apparatus 1000. The mapper 531 may perform first mapping on a foreground area of the image information and second mapping on a background area of the image information. In this embodiment, the first mapping may include mapping the foreground area to a plurality of expression members in the information output apparatus 1000 and the second mapping may include mapping the background area to a plurality of expression members in the information output apparatus 1000.

The first activation area calculator 541-1 may calculate a protrusion actuated position of each of expression members in the foreground area according to a first mapping result. Thereafter, when first mapped expression members for the foreground area are actuated by the information output unit 600 to protrude, a user may recognize the foreground area of the image information by sensing the first mapped expression members.

The second activation area calculator 541-2 may calculate a retraction actuated position of each of expression members in the background area according to a second mapping result. Thereafter, when second mapped expression members for the background area are actuated by the information output unit 600 to retract, a user may recognize the background area of the image information by sensing the second mapped expression members.

The size of the image information output in the information output apparatus 1000 may be controlled by a user's touch gesture or operation of a button (1001 in FIG. 8) in a current state. When an image size control signal is received, the mapper 531 may newly perform mapping on the foreground area and the background area, and protrusion and retraction actuated positions of expression members may be newly calculated. In addition, when the information output apparatus 1000 rotates (to landscape or portrait) according to a gyro sensor (not shown) sensing a rotation state of the information output apparatus 1000, the mapper 531 may newly perform mapping on the foreground area and the background area in response to a rotation result, and protrusion and retraction actuated positions of expression members may be newly calculated.

The case where image information to be output is not pure image information but text information will be described in an embodiment. For example, the case where the text "Korea automobile" is output in the information output apparatus 1000 may be included. In this case, the mapper 531 may map text information to be output to a plurality of expression members in the information output apparatus 1000. The mapper 531 may perform first mapping on text itself of the text information and second mapping on the other portion excluding the text. In this embodiment, the first mapping may include mapping the text itself to a plurality of expression members in the information output apparatus 1000 and the second mapping may include mapping the other portion excluding the text to a plurality of expression members in the information output apparatus 1000. In other words, the second mapping may be performed on all N×N expression members except first mapped expression members.

The first activation area calculator 541-1 may calculate a protrusion actuated position of each of expression members in the text itself according to a first mapping result. Thereafter, when first mapped expression members for the text itself are actuated by the information output unit 600 to protrude, a user may recognize the text by sensing the first mapped expression members.

The second activation area calculator 541-2 may calculate a retraction actuated position of each of expression members in the other portion excluding the text according to a second mapping result. Thereafter, when second mapped expression members for the other portion excluding the text are actuated by the information output unit 600 to retract, a user senses the second mapped expression members, and accordingly, the recognition rate of the text may be increased.

The size of the text information output in the information output apparatus 1000 may be controlled by a user's touch gesture or operation of a button (1001 in FIG. 8) in a current state. When a text size control signal is received, the mapper 531 may newly perform mapping on the text itself and the other portion excluding the text, and protrusion and retraction actuated positions of expression members may be newly calculated. In addition, when the information output apparatus 1000 rotates (to landscape or portrait) according to a gyro sensor (not shown) sensing a rotation state of the information output apparatus 1000, the mapper 531 may newly perform mapping on the text itself and the other portion excluding the text in response to a rotation result, and protrusion and retraction actuated positions of expression members may be newly calculated.

Figure 4:
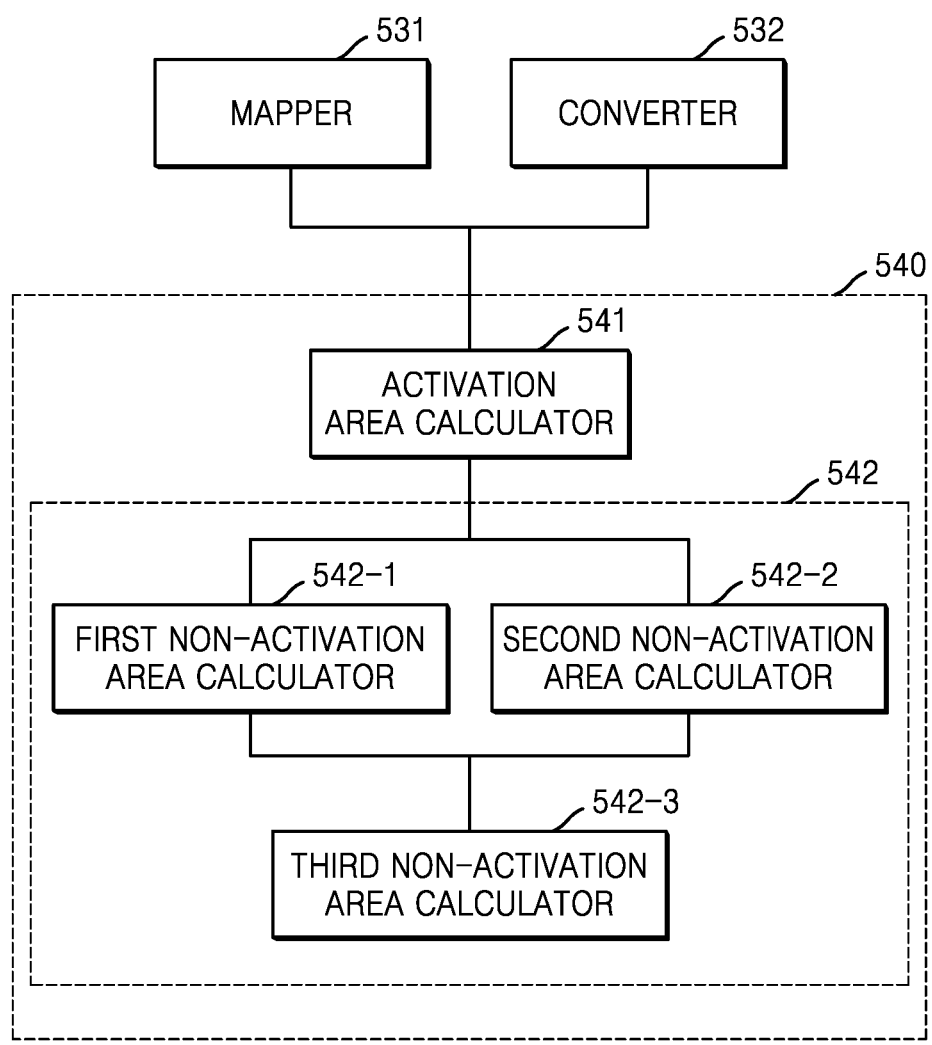
FIG. 4 is a schematic diagram of the detailed configuration of the processor and the calculator in the first information processing unit of FIG. 2, according to another embodiment.

FIG. 4 is a schematic diagram of the detailed configuration of the processor 530 and the calculator 540 in the first information processing unit 500 of FIG. 2, according to another embodiment. Referring to FIG. 4, the processor 530 may include the mapper 531 and a converter 532 and the calculator 540 may include an activation area calculator 541 and a non-activation area calculator 542. Accordingly, it may be said that FIG. 4 is a diagram for explaining information processing and calculation in the braille information output mode as the second information output mode.

The mapper 531 may map braille information to a plurality of expression members in the information output apparatus 1000. The braille information may be output in units of braille cells including six dots in three rows and two columns. In this embodiment, a braille cells may include six expression members and a single braille letter may be output using six expression members. In this embodiment, a single braille cell includes six expression members, but the present disclosure is not limited thereto. A single braille cell may include two to eight expression members and, in some cases, may include more expression members. The mapper 531 may map braille information including at least one selected from a word, a sentence component, a sentence, and a paragraph.

In an embodiment, the converter 532 may convert externally received text information and/or internally generated text information into braille information. The converter 532 may store a braille table and braille letters including Hangeul consonants (ㄱ, ㄴ, ㄷ, . . . , ㅎ), Hangeul vowels (ㅏ, ㅑ, ㅓ, . . . , ㅖ), tense consonants (ㄲ, ㄸ, ㅃ, ㅆ, ㅉ), abbreviations (가, 사, . . . , 그런데, 그러므로, 그리하여) digits (1, 2, 3, . . . , 0), signs (?, !, +, . . . ), or English alphabets (A, B, C, . . . , Z). Accordingly, when text information is received, the converter 532 may convert the text information into braille information based on the braille table and transmit the braille information to the mapper 531 such that the braille information may be mapped to a plurality of expression members in the information output apparatus 1000.

The activation area calculator 541 may calculate protrusion actuated positions and retraction actuated positions of expression members corresponding to the braille information according to a mapping result. Thereafter, when the expression members for a braille letter are actuated by the information output unit 600 to protrude and/or retract, a user may recognize the braille letter by sensing the positions and number of expression members in a braille cell.

The non-activation area calculator 542 may calculate a retraction maintained position of an expression member for making braille distinguished in an activation area. In this embodiment, the non-activation area calculator 542 may include first through third non-activation area calculators 542-1 through 542-3.

The first non-activation area calculator 542-1 may calculate, as a first non-activation area, an expression member array, for example, of three rows and one column, between braille columns to distinguish one braille column from another. Thereafter, when the first non-activation area, i.e., the expression member array of three rows and one column, is maintained retracted by the information output unit 600, a user may sense the positions and number of retraction maintained expression members and recognize an area distinguishing one braille column from another.

The second non-activation area calculator 542-2 may calculate, as a second non-activation area, an expression member array, for example, of one row and one column, between braille rows to distinguish one braille row from another. Thereafter, when the second non-activation area, i.e., the expression member array of one row and one column, between braille rows is maintained retracted by the information output unit 600, a user may sense the positions and number of retraction maintained expression members and recognize an area distinguishing one braille row from another.

The third non-activation area calculator 542-3 may calculate, as a third non-activation area, an expression member array, for example, of two rows and two columns, between braille paragraphs to distinguish one braille paragraph from another. Thereafter, when the third non-activation area, i.e., the expression member array of two rows and two columns, between braille paragraphs is maintained retracted by the information output unit 600, a user may sense the positions and number of retraction maintained expression members and recognize an area distinguishing one braille paragraph from another.

Figure 5:
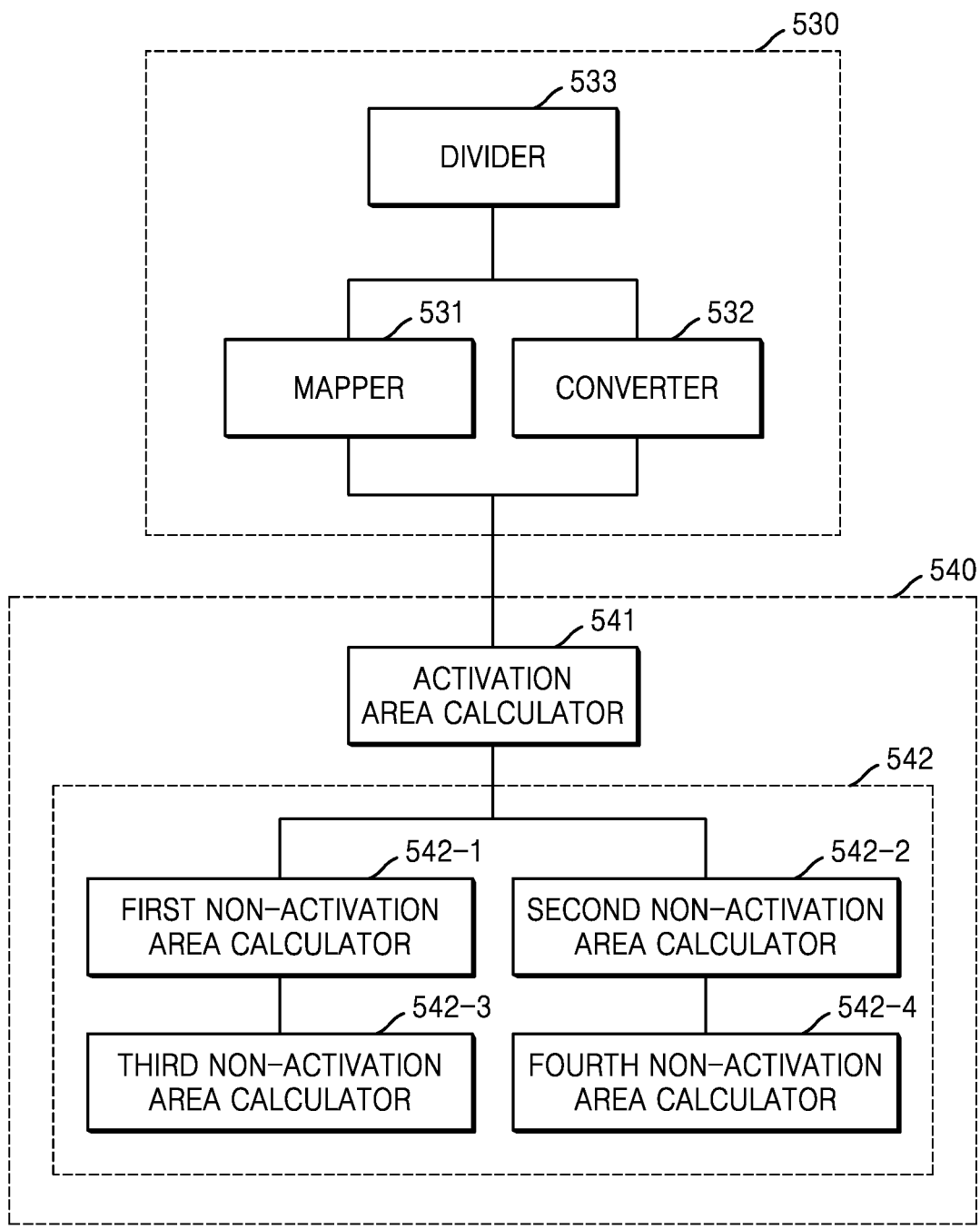
FIG. 5 is a schematic diagram of the detailed configuration of the processor and the calculator in the first information processing unit of FIG. 2, according to another embodiment.

FIG. 5 is a schematic diagram of the detailed configuration of the processor 530 and the calculator 540 in the first information processing unit 500 of FIG. 2, according to another embodiment. Referring to FIG. 5, the processor 530 may include the mapper 531, the converter 532, and a divider 533 and the calculator 540 may include the activation area calculator 541 and the non-activation area calculator 542. Accordingly, it may be said that FIG. 5 is a diagram for explaining information processing and calculation in the mixed information output mode (i.e., an image and braille information output mode) as the third information output mode.

For the mixed information output mode as the third information output mode, the divider 533 may divide the information output apparatus 1000 into a first display area and a second display area such that image information may be output to one of the first and second display area and braille information may be output to the other section. For example, it is assumed that image information is output to the first display area and braille information is output to the second display area.

In an optional embodiment, the divider 533 may fix the first display area and move the second display area. Here, the fixing of the first display area may refer to maintaining output of image information in the first display area and the moving of the second display area may refer to changing output of braille information in the second display area. For example, when braille information including first through third paragraphs needs to be output to the second display area in a state where image information has been output to the first display area, all of the first through third paragraphs could not be simultaneously output to the second display area. In this case, in a state where the first display area is fixed, braille information corresponding to the first paragraph may be first output to the second display area and then braille information corresponding to the second paragraph and braille information corresponding to the third paragraph may be sequentially output at a certain time interval (e.g., of 1 second) or when a user's touch is sensed in an end portion of the second display area.

The mapper 531 may map image information to be output to a plurality of expression members in the first display area and braille information to be output to a plurality of expression members in the second display area. The converter 532 may convert text information into braille information and transmit the braille information to the mapper 531. The detailed descriptions of the mapper 531 and the converter 532 are the same as those given in FIGS. 3 and 5 and thus will be omitted.

The activation area calculator 541 may calculate a protrusion actuated position of each of expression members in a foreground area and a retraction actuated position of each of expression members in a background area according to a result of mapping image information to be output to the first display area and may calculate protrusion actuated positions and/or retraction actuated positions of expression members according to a result of mapping braille information to be output to the second display area.

The non-activation area calculator 542 may calculate a retraction maintained position of an expression member for making braille distinguished in an activation area of the second display area and may calculate a retraction maintained position of an expression member for a fourth non-activation area, i.e., a separating non-activation area, which separates the first display area from the second display area. In this embodiment, the non-activation area calculator 542 may include first through fourth non-activation area calculators 542-1 through 542-4. The operations of the first through third non-activation area calculators 542-1 through 542-3 are the same as those described in FIG. 4, excepting that braille is output to the second display area, and thus descriptions thereof will be omitted.

To separate image information from braille information, the fourth non-activation area calculator 542-1 may calculate, as a fourth non-activation area, an expression member array arranged in, for example, three rows and three columns, between the first display area and the second display area. Thereafter, when the fourth non-activation area, i.e., the expression member array of three rows and three columns, between the first display area and the second display area is maintained retracted by the information output unit 600, a user may sense the positions and number of retraction maintained expression members and recognize an area separating the first display area from the second display area.

Figure 6:
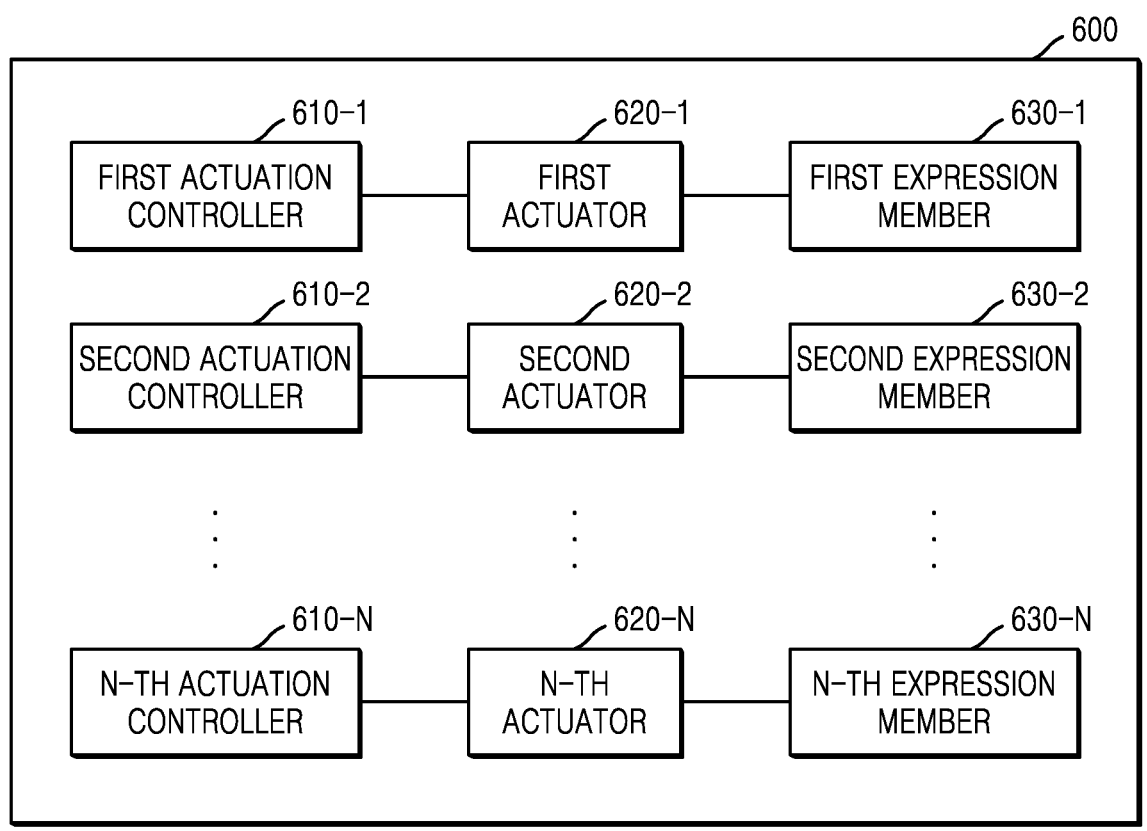
FIG. 6 is a schematic diagram of the detailed configuration of an information output unit in the information output apparatus of FIG. 1.

FIG. 6 is a schematic diagram of the detailed configuration of the information output unit 600 in the information output apparatus 1000 of FIG. 1. Referring to FIG. 6, the information output unit 600 may include first through N-th actuation controllers 610-1 through 610-N, first through N-th actuators 620-1 through 620-N, and first through N-th expression members 630-1 through 630-N respectively connected to the first through N-th actuators 620-1 through 620-N performing a linear motion (i.e., protrusion or retraction) under the control of the first through N-th actuation controllers 610-1 through 610-N, respectively.

The first through N-th actuation controllers 610-1 through 610-N may respectively control the first through N-th actuators 620-1 through 620-N according to an activation area calculation result and a non-activation area calculation result, which are output from the first information processing unit 500, such that at least one selected from the first through N-th expression members 630-1 through 630-N is actuated to protrude and/or retract. The first through N-th actuation controllers 610-1 through 610-N may control a duration of a protrusion actuated state and/or a retraction actuated state with respect to expression members, respectively.

In this embodiment, protrusion actuating may include controlling a corresponding actuator such that at least one selected from the first through N-th expression members 630-1 through 630-N is raised at least a certain height (e.g., 0.5 cm) from a bottom surface of a display area of the information output apparatus 1000. In this embodiment, retraction actuating may include controlling a corresponding actuator such that at least one selected from the first through N-th expression members 630-1 through 630-N does not rise from or is positioned at the bottom surface of the display area of the information output apparatus 1000.

In the image information output mode, the first through N-th actuation controllers 610-1 through 610-N may control a corresponding actuator such that at least one expression member, which is mapped to a first activation area calculation result output from the first information processing unit 500 among the first through N-th expression members 630-1 through 630-N, is actuated to protrude and may control a corresponding actuator such that at least one expression member, which is mapped to a second activation area calculation result output from the first information processing unit 500 among the first through N-th expression members 630-1 through 630-N, is actuated to retract.

In the braille information output mode, the first through N-th actuation controllers 610-1 through 610-N may control a corresponding actuator such that at least one expression member, which is mapped to an activation area calculation result output from the first information processing unit 500 among the first through N-th expression members 630-1 through 630-N, is actuated to protrude and/or retract and may control a corresponding actuator such that at least one expression member, which is mapped to a non-activation area calculation result output from the first information processing unit 500 among the first through N-th expression members 630-1 through 630-N, is maintained retracted.

In the mixed information output mode, the first through N-th actuation controllers 610-1 through 610-N may divide the first through N-th expression members 630-1 through 630-N into the first display area and the second display area, may control a corresponding actuator such that an expression member in the first display area is actuated to protrude and/or retract in correspondence to the image information output mode, and may control a corresponding actuator such that an expression member in the second display area is actuated to protrude and/or retract or maintained retracted in correspondence to the braille information output mode. In this embodiment, the first through N-th actuation controllers 610-1 through 610-N may operate such that an expression member array of three rows and three columns is maintained retracted in the fourth non-activation area.

Figure 7:
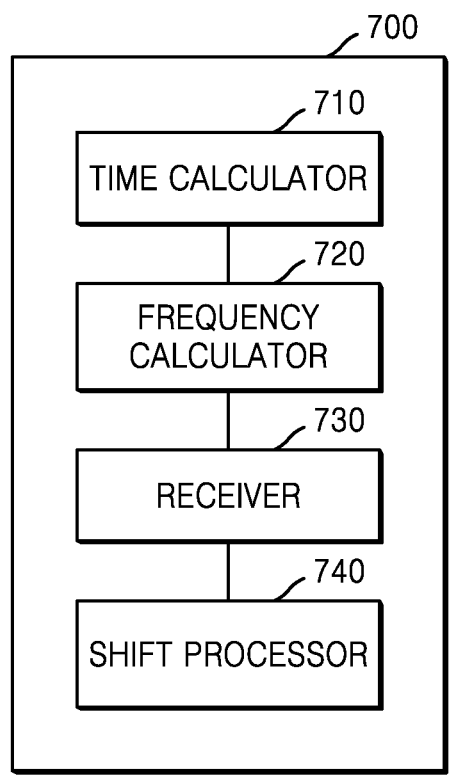
FIG. 7 is a schematic diagram of the detailed configuration of a second information processing unit in the information output apparatus of FIG. 1.

FIG. 7 is a schematic diagram of the detailed configuration of the second information processing unit 700 in the information output apparatus 1000 of FIG. 1. Referring to FIG. 7, the second information processing unit 700 may include a time calculator 710, a frequency calculator 720, a receiver 730, and a shift processor 740.

It may be seen from the embodiments described above that each of expression members 630 in the activation area and the non-activation area is connected or mapped to an actuator 620 and protrudes or retracts due to the linear motion of the actuator 620 controlled by an actuation controller 610, and accordingly, protrusion or retraction of each expression member 630 coincides with protrusion or retraction of the actuator 620. In addition, the actuator 620 mechanically operates the expression member 630 under the control of the actuation controller 610 and thus includes an operating life such that the actuator 620 stops operating after a certain time elapses.

An actuator 620 mapped to the activation area may protrude or retract and an actuator 620 mapped to the non-activation area may maintain retraction. The non-activation area, in which retraction is maintained, may include the first non-activation area (e.g., an array of actuators 620 arranged in three rows and one column between braille columns) in a fixed location, the second non-activation area (e.g., an array of actuators 620 arranged in one row and one column between braille rows) in a fixed location, the third non-activation area (e.g., an array of actuators 620 arranged in two rows and two columns between braille paragraphs) in a fixed location, and the fourth non-activation area (e.g., an array of actuators 620 arranged in three rows and three columns between the first display area and the second display area) in a fixed location. Therefore, the operating time and/or number of the actuator 620 in the activation area may be different from the operating time and/or number of the actuator 620 in the non-activation area, and accordingly, the life of the actuator 620 in the activation area is different from the life of the actuator 620 in the non-activation area. In detail, the life of the actuator 620 in the activation area is shorter. A difference in the life of the actuator 620 may affect the smooth operation of the information output apparatus 1000. Furthermore, the life of the information output apparatus 1000 may be shorter than a predetermined time.

When the second information processing unit 700 shifts the activation area and the non-activation area in a certain direction in response to an elapse of a certain time, an excess of a certain frequency, or a user's shift request signal, all actuators 620 may have a uniform life.

The time calculator 710 may calculate a certain time in which the activation area and the non-activation area may be shifted. Here, the calculation of the certain time may include counting and accumulating the certain time. In addition, the certain time may include an absolute time including either a first shift start time (e.g., a week or a month from a setting start time), which is set by a user, or a second shift start time (e.g., 200 hours from the initial operation of the information output apparatus 1000), which is programmed and stored in the program storage unit 300 during the manufacture of the information output apparatus 1000. In addition, the certain time may include a third shift start time (e.g., 150 hours from the initial operation of the information output apparatus 1000) indicating an operating time in which the information output apparatus 1000 substantially outputs information. In this embodiment, the second shift start time may be different from the third shift start time. The second shift start time may include a time continuously counted since the initial operation of the information output apparatus 1000, in both the case where the information output apparatus 1000 outputs information and the case where the information output apparatus 1000 does not output information. The third shift start time may include a time counted only when the information output apparatus 1000 outputs information. In addition, the certain time may include a fourth shift start time (e.g., 100 hours of protrusion and 100 hours of retraction) indicating a protrusion actuating time and a retraction actuating time of each actuator 620 in the activation area. The shift processor 740 may shift the activation area and the non-activation area in a certain direction when one of the first through fourth shift start times is reached or may set a priority order for the first through fourth shift start times and shift the activation area and the non-activation area in a certain direction when a shift start time having priority is reached.

The frequency calculator 720 may calculate a certain frequency at which the activation area and the non-activation area may be shifted in a certain direction. Here, the calculation of the certain frequency may include counting and accumulating the certain frequency, i.e., a certain number. The certain frequency may include a protrusion actuating frequency and a retraction actuating frequency (e.g., 1000 protrusions and retractions) of each actuator 620 in the activation area since the initial operation of the information output apparatus 1000.

The receiver 730 may receive a shift request signal from a user such that the activation area and the non-activation area may be shifted in a certain direction. In this embodiment, the shift request signal received from a user may be given a top priority over the certain time and the certain frequency. The receiver 730 may receive a shift direction setting signal from a user. When the shift direction setting signal is not received from the user, a programmed shift direction may be set.

The shift processor 740 may substantially shift the activation area and the non-activation area in a certain direction in response to an elapse of the certain time, an excess of the certain frequency, and the user's shift request signal. Here, the certain direction may include a programmed horizontal direction shifting by at least one column or a programmed vertical direction shifting by at least one row. As described above, the certain direction may further include the number of columns and/or the number of rows, that is, the amount of shift, together with a direction. The certain direction may include a direction in which a previous activation area is converted into a non-activation area after the shift. In an optional embodiment, the shift processor 740 may calculate an average of protrusion and retraction actuating times and/or an average of protrusion and retraction actuating frequencies with respect to each actuator 620 in the activation area and may shift the activation area and the non-activation area in a certain direction such that an actuator 620 having a highest actuating time and/or a highest actuating frequency is located in the non-activation area. In an optional embodiment, when there is at least one dummy area (e.g., one or two rightmost/leftmost lines or one or two topmost/bottom most lines in the information output apparatus 1000), in which a braille cell having three rows and two columns cannot be formed, in the activation area after the activation area and the non-activation area are shifted, the shift processor 740 may convert the dummy area into the non-activation area.

Figure 8:
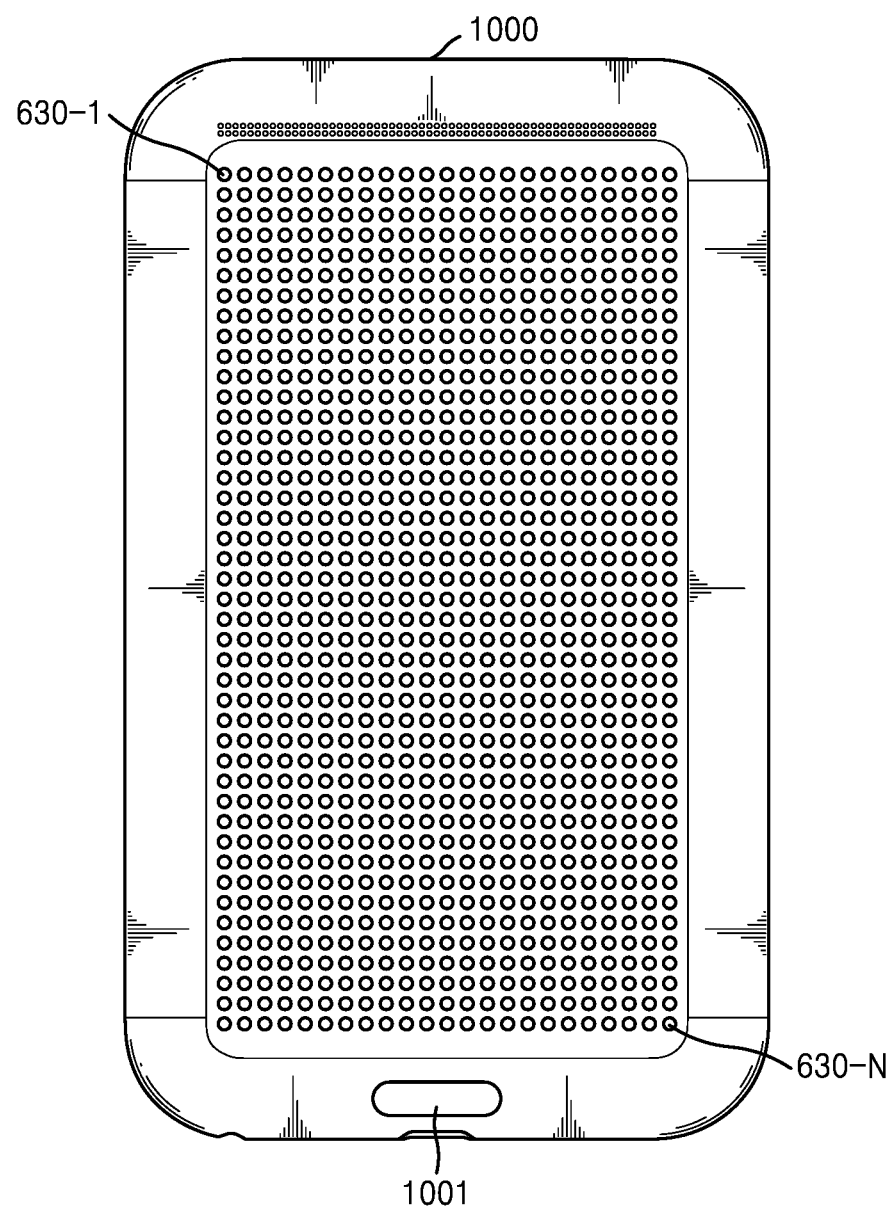
FIG. 8 is a diagram of the front of an information output apparatus according to an embodiment.

FIG. 8 is a diagram of the front of the information output apparatus 1000 according to an embodiment. Referring to FIG. 8, the front of the information output apparatus 1000 may include N expression members 630-1 through 630-N to output image information, braille information, or mixed information, and the N expression members 630-1 through 630-N may be actuated to protrude or retract by the linear motion of the first through N-th actuators 620-1 through 620-N, respectively, under the control of the first through N-th actuation controllers 610-1 through 610-N, respectively. In addition, the information output apparatus 1000 of FIG. 8 may include at least one button 1001 and may perform an additional function (e.g., power-on, returning to a previous stage, selecting, moving a screen, or screen zooming) corresponding to an input of the button 1001.

Figure 9:
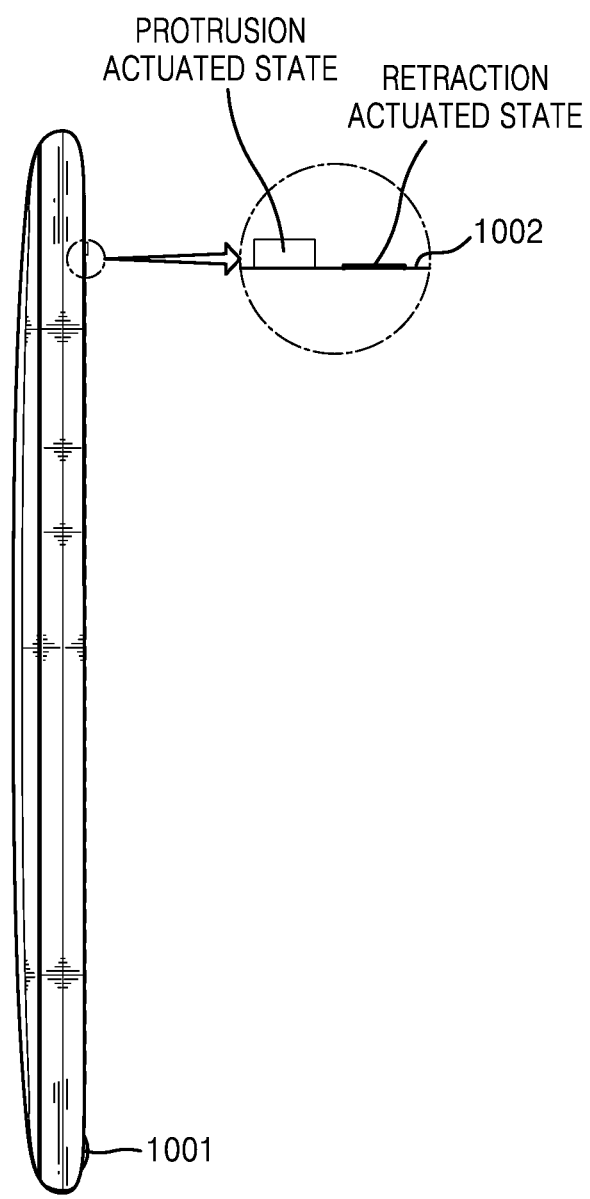
FIG. 9 is a diagram of a side of an information output apparatus according to an embodiment.

FIG. 9 is a diagram of a side of an information output apparatus 1000 according to an embodiment. Referring to FIG. 9, a protrusion actuated state of an expression member 630 and a retraction actuated state of an expression member 630 may be recognized when viewed from the side of the information output apparatus 1000. The protrusion actuated state of the expression member 630 may include a state where the expression member 630 is raised at least a certain height (e.g., at least 0.6 cm) from a bottom surface 1002 of a display area of the information output apparatus 1000. The retraction actuated state of the expression member 630 may include a state where the expression member 630 is positioned at the bottom surface 1002 of the display area of the information output apparatus 1000.

Figure 10A:
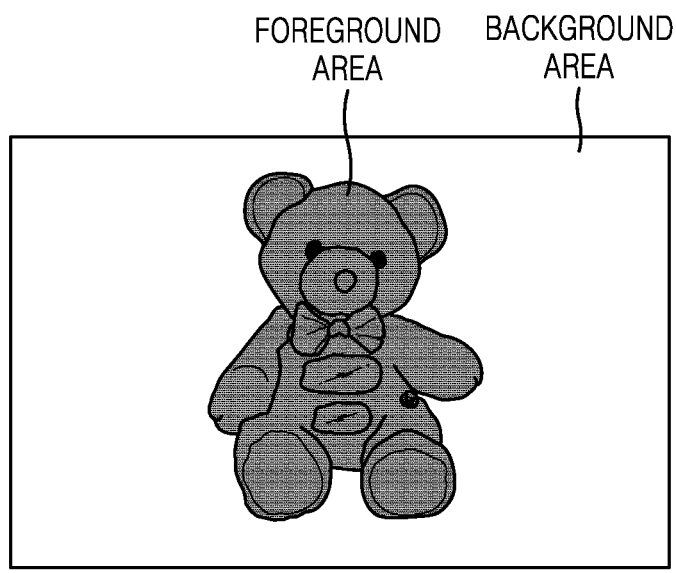
FIGS. 10A through 13 are exemplary diagrams relating to information output in an information output apparatus, according to embodiments.
Figure 10B:
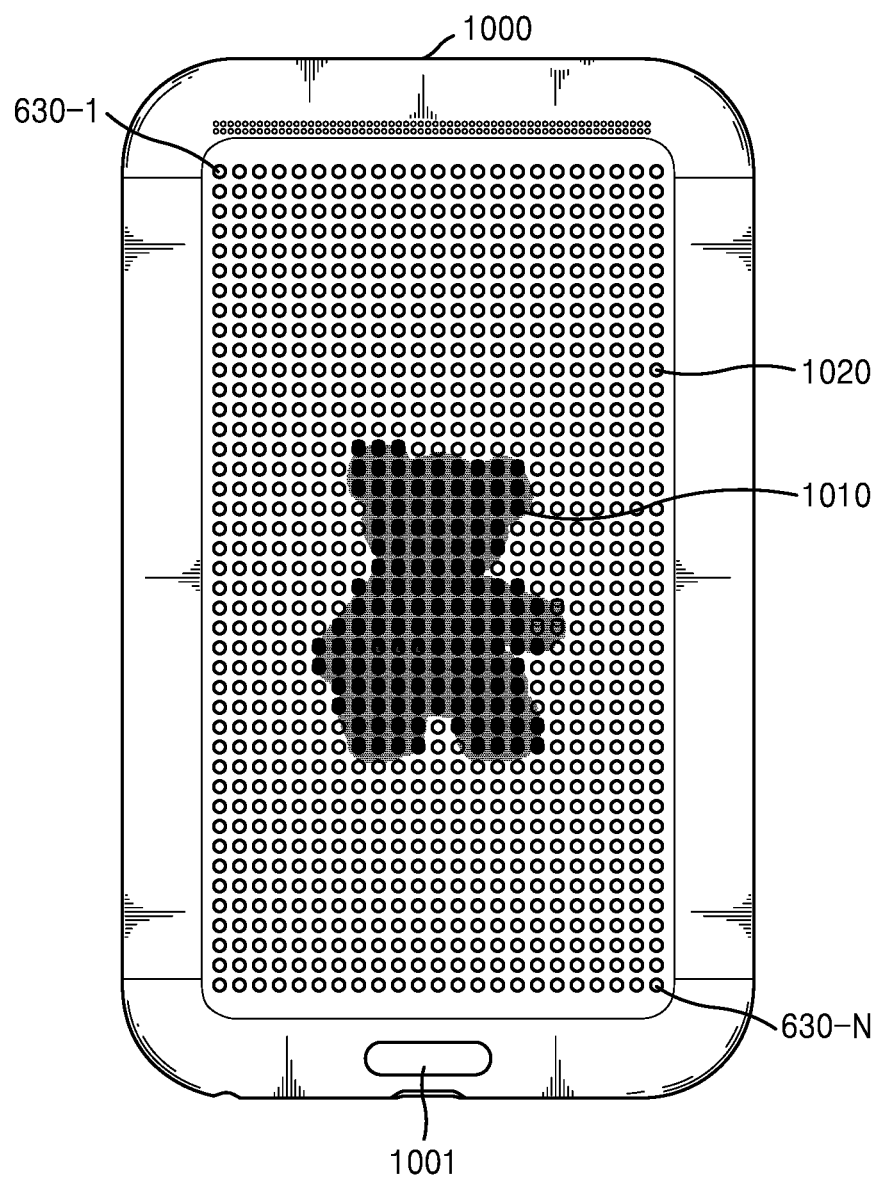

FIGS. 10A and 10B are exemplary diagrams relating to information output in the information output apparatus 1000 of FIG. 8, according to an embodiment. FIGS. 10A and 10B show the case where the information output apparatus 1000 operates in the image information output mode as the first information output mode. FIG. 10A shows image information divided into a foreground area and a background area and FIG. 10B shows a state in which the image information is output to the first through N-th expression members 630-1 through 630-N in the information output apparatus 1000. In the foreground area of the image information, at least one expression member mapped among the first through N-th expression members 630-1 through 630-N is calculated as a first activation area 1010 and actuated to protrude. In the background area of the image information, at least one mapped expression member is calculated as a second activation area 1020 and actuated to retract. A user may sense expression members actuated to protrude in the first activation area 1010 and/or expression members actuated to retract in the second activation area 1020, thereby recognizing the foreground area and the background area of the image information.

Figure 11:
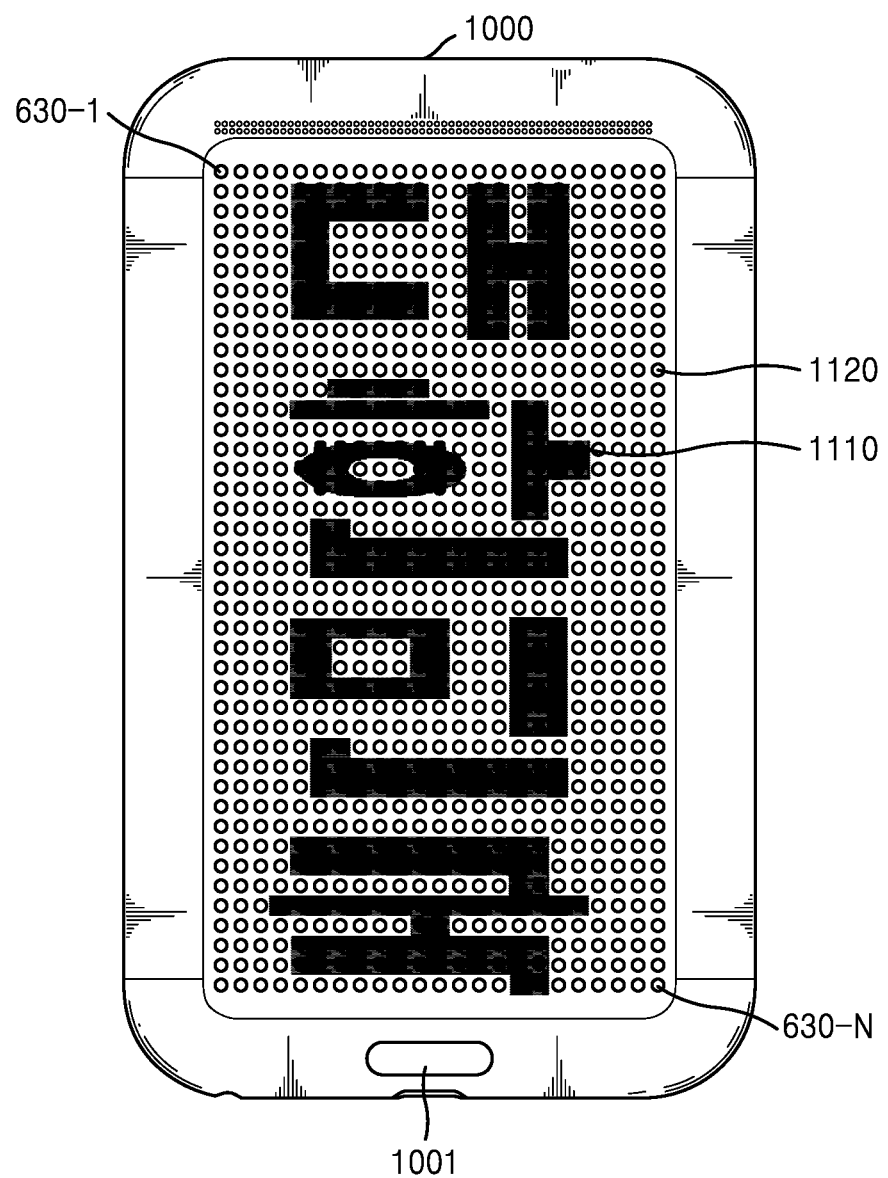

FIG. 11 is an exemplary diagram relating to information output in the information output apparatus 1000 of FIG. 8, according to another embodiment. FIG. 11 shows the case where the information output apparatus 1000 outputs text information included in image information in the first information output mode. In FIG. 11, at least one expression member mapped to text itself among the first through N-th expression members 630-1 through 630-N is calculated as a first activation area 1110 and actuated to protrude, and the other expression members mapped to a portion excluding the text are calculated as a second activation area 1120 and actuated to retract. A user may sense expression members actuated to protrude in the first activation area 1110 and/or expression member actuated to retract in the second activation area 1120, thereby recognizing the text information.

Figure 12:
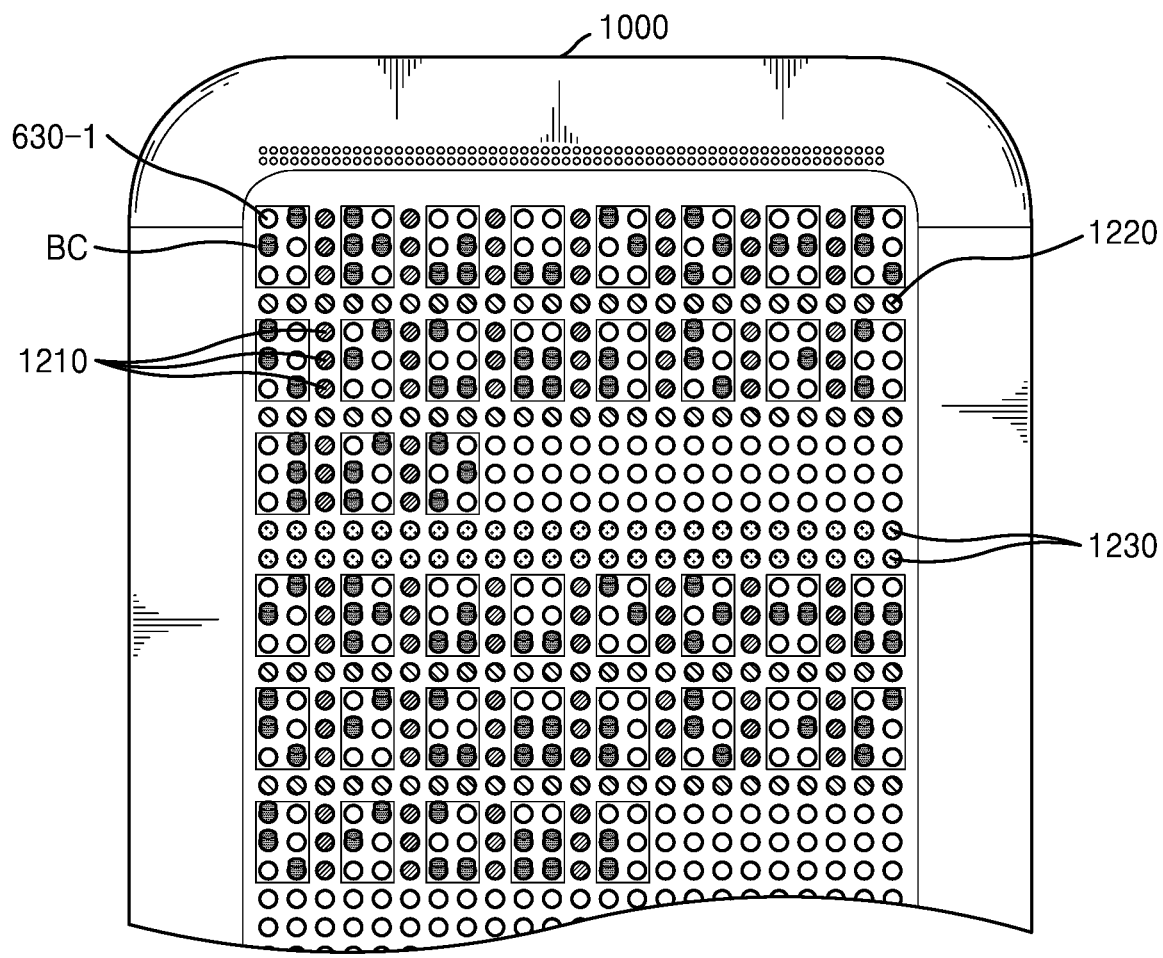

FIG. 12 is an exemplary diagram relating to information output in the information output apparatus 1000 of FIG. 8, according to another embodiment. FIG. 12 shows a state where the information output apparatus 1000 outputs braille information to expression members 630 in an activation area in the braille information output mode as the second information output mode.

A first non-activation area 1210 includes, for example, three expression members 630 arranged in three rows and one column between columns of respective braille cells BC, and it is shown that the three expression members 630 arranged in three rows and one column in the first non-activation area 1210 are maintained retracted. A second non-activation area 1220 includes, for example, an expression member 630 arranged in one row and one column between rows of respective braille cells BC, and it is shown that the expression member 630 arranged in one row and one column in the second non-activation area 1220 is maintained retracted. A third non-activation area 1230 includes, for example, expression members 630 arranged in two rows and two columns between paragraphs of braille cells BC, and it is shown that the expression members 630 arranged in two rows and two columns in the third non-activation area 1230 are maintained retracted.

Figure 13:
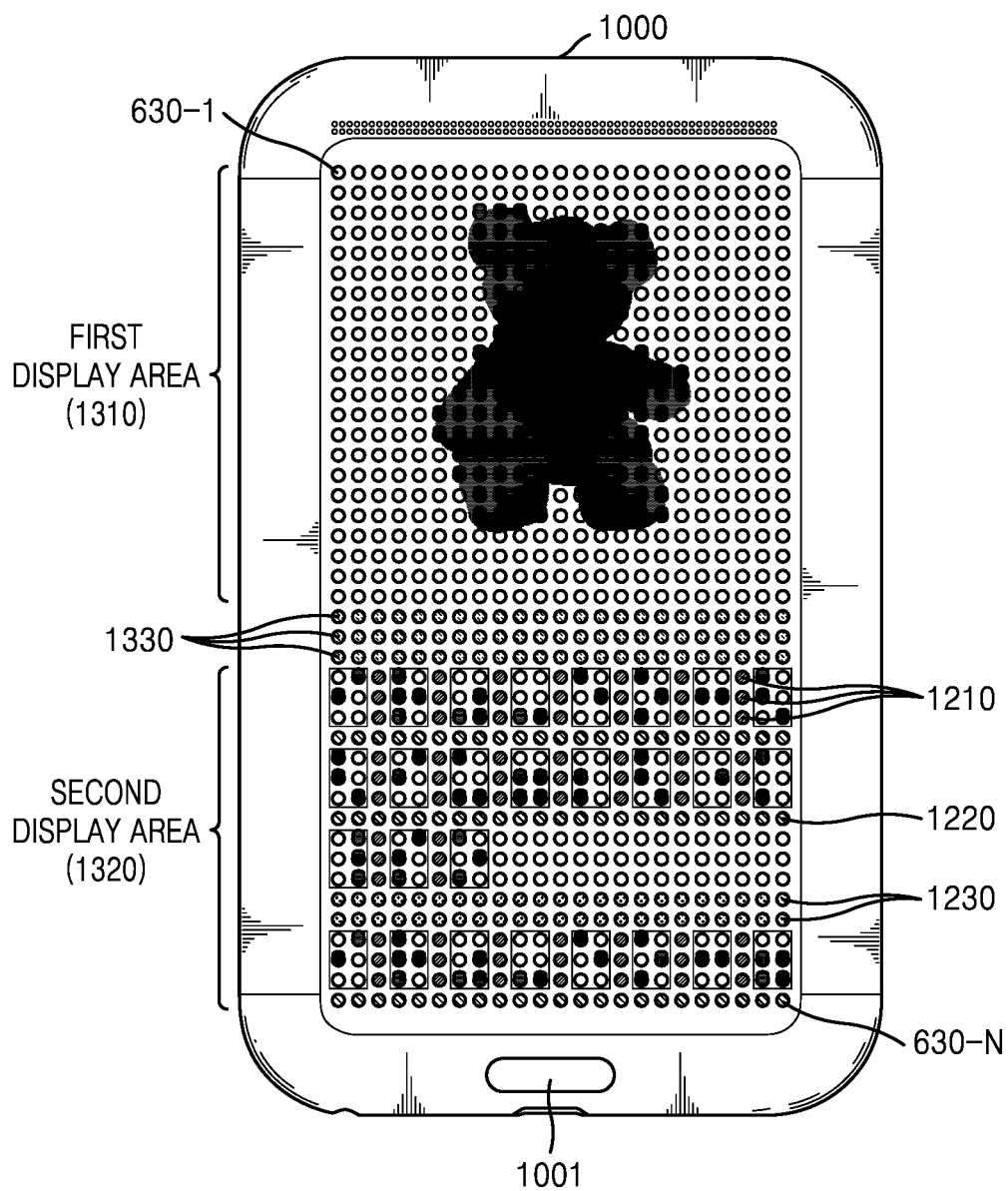

FIG. 13 is an exemplary diagram relating to information output in the information output apparatus 1000 of FIG. 8, according to another embodiment. FIG. 13 shows a case where the information output apparatus 1000 operates in the mixed information output mode as the third information output mode.

FIG. 13 shows an example in which the information output apparatus 1000 is divided into a first display area 1310 and a second display area 1320 and image information is output in the first display area 1310 via protrusion and/or retraction of expression members, and detailed descriptions thereof are the same as those given in FIG. 9 and will thus be omitted. An example in which braille information is output in the second display area 1320 via protrusion and/or retraction of expression members and retraction maintaining of expression members is shown, and detailed descriptions thereof are the same as those given in FIG. 12 and will thus be omitted. FIG. 13 shows an example in which a fourth non-activation area 1330 is further provided as a separating non-activation area. The fourth non-activation area 1330 includes, for example, expression members 630 arranged three rows and three columns in a location separating the first display area 1310 from the second display area 1320, and it is shown that the expression members 630 arranged in three rows and three columns in the fourth non-activation area 1330 are maintained retracted.

Figure 14A:
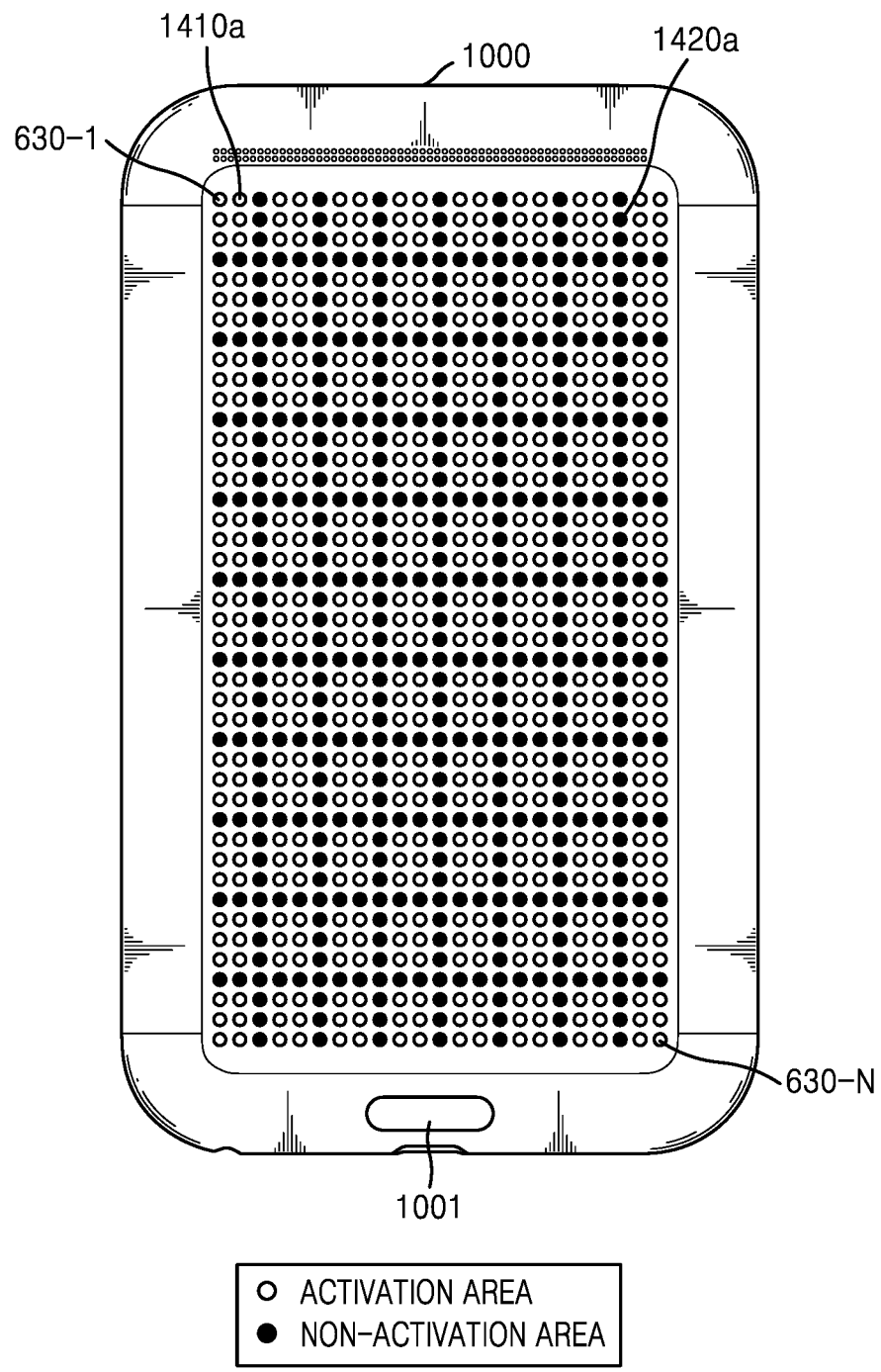
FIGS. 14A and 14B are exemplary diagrams relating to a shift result of an information output apparatus, according to an embodiment.
Figure 14B:
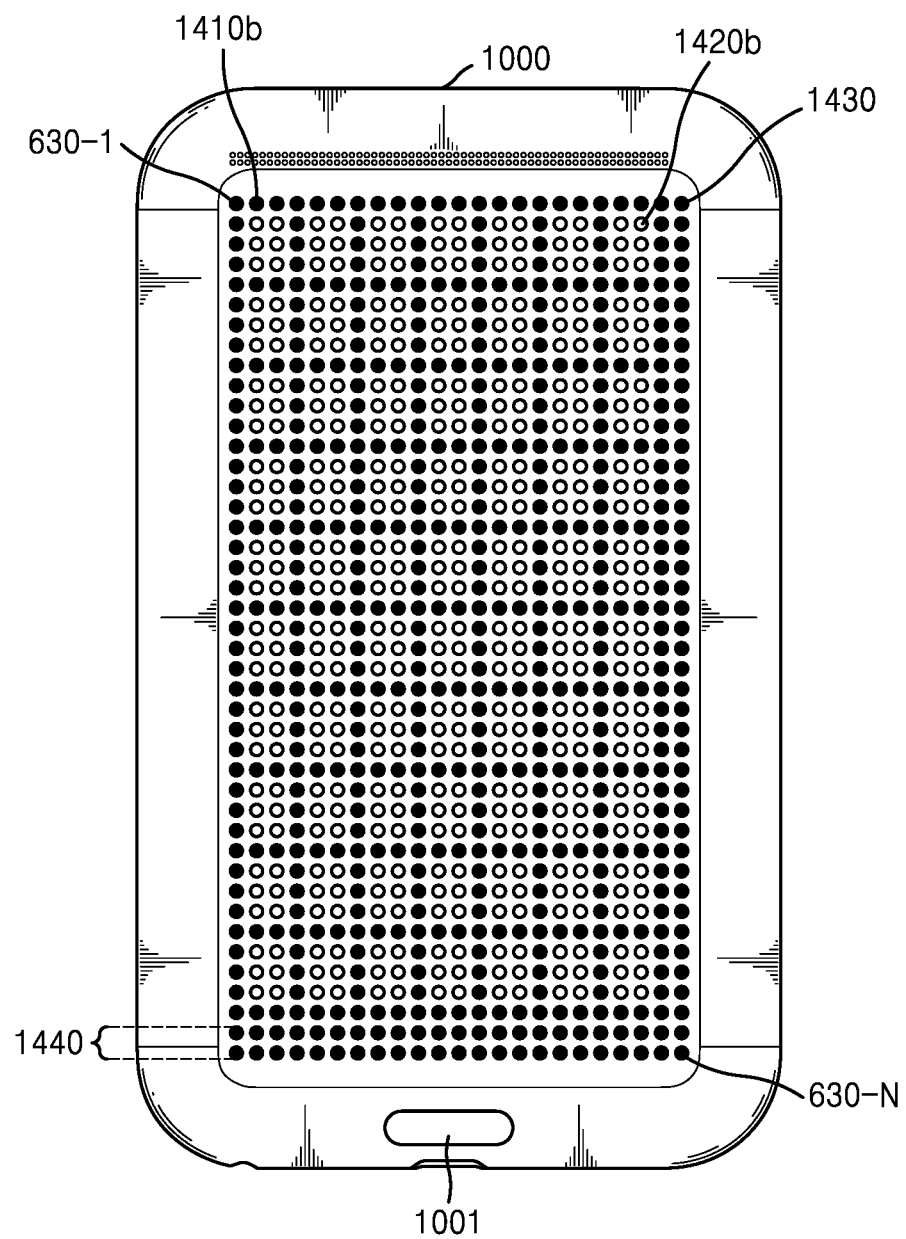

FIGS. 14A and 14B are exemplary diagrams relating to a shift result of the information output apparatus 1000, according to an embodiment. FIG. 14A shows an exemplary diagram of the information output apparatus 1000 before a shift and FIG. 14B shows an exemplary diagram of the information output apparatus 1000 after the shift. FIG. 14B shows a result of shifting an activation area and a non-activation area one column to the right and one row down in the information output apparatus 1000. When FIGS. 14A and 14B are compared with each other, it may be seen that an activation area 1410a before the shift is converted into a non-activation area 1410b after the shift and a non-activation area 1420a before the shift is converted into an activation area 1420b after the shift. In addition, when there is at least one dummy area (e.g., a column 1430 and rows 1440), which is included in an activation area but cannot form a braille cell including three rows and two columns, in FIG. 14B, the information output apparatus 1000 may convert the dummy area into the non-activation area.

Figure 15:
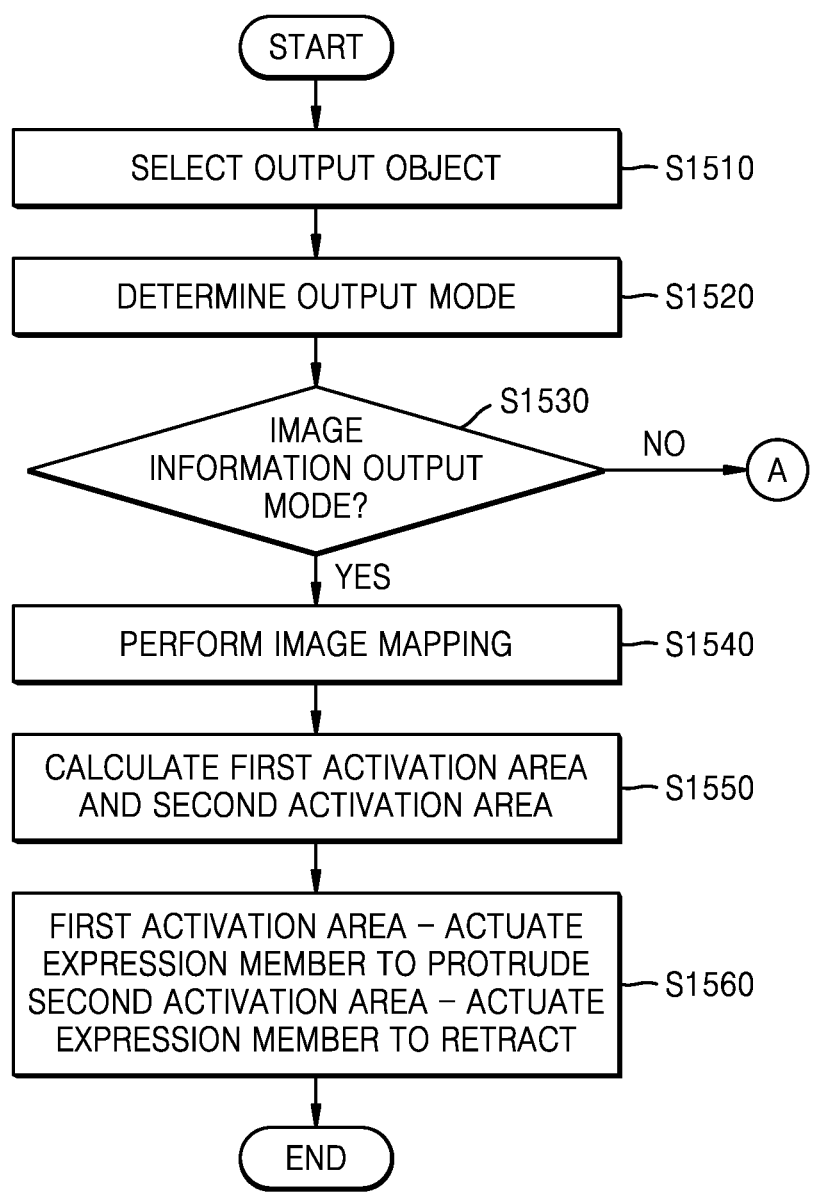
FIGS. 15 through 17 are flowcharts of an information output method according to an embodiment.
Figure 16:
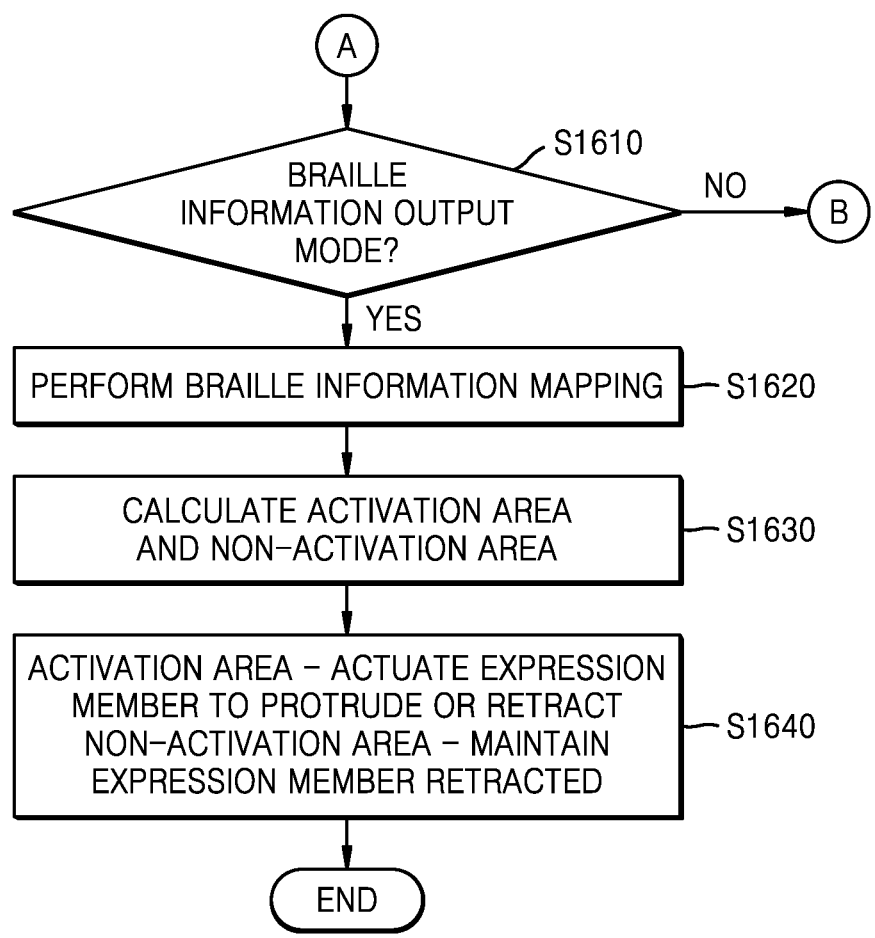
Figure 17:
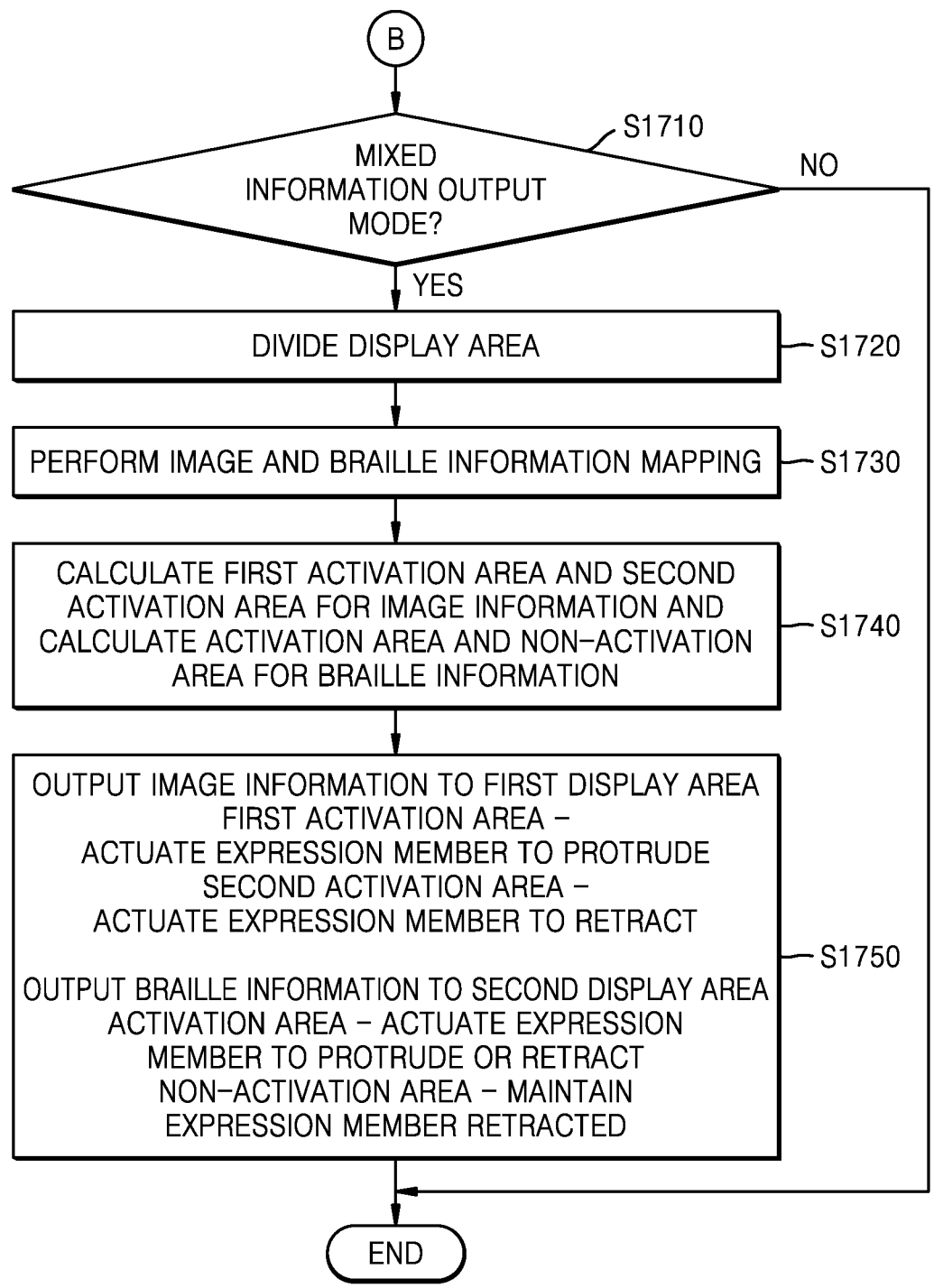

FIGS. 15 through 17 are flowcharts of an information output method according to an embodiment. Redundant descriptions given in FIGS. 1 through 14B will be omitted below. FIG. 15 is a flowchart of an information output method corresponding to the image information output mode, FIG. 16 is a flowchart of an information output method corresponding to the braille information output mode, and FIG. 17 is a flowchart of an information output method corresponding to the mixed information output mode.

Referring to FIG. 15, the information output apparatus 1000 may select an output object to be output from information externally received through the communication unit 100, information stored in the memory 200, and/or internally generated information in operation S1510.

The information output apparatus 1000 may determine an information output mode for the selected output object in operation S1520. The information output apparatus 1000 may classify the information output mode into three modes including an image information output mode as a first information output mode, a braille information output mode as a second information output mode, and a mixed information output mode (i.e., an image and braille information output mode) as a third information output mode.

The information output apparatus 1000 may determine whether the output mode is the image information output mode in operation S1530 and, when the output mode is the image information output mode, may divide image information to be output into a foreground area and a background area and map the foreground area and the background area to a plurality of expression members in the information output apparatus 1000 in operation S1540.

When the mapping is completed, the information output apparatus 1000 may calculate a first activation area, as a protrusion actuated position of each of a plurality of expression members in the foreground area, and a second activation area, as a retraction actuated position of each of a plurality of expression members in the background area, in operation S1550.

The information output apparatus 1000 may actuate an expression member to protrude for the first activation area and actuate an expression member to retract for the second activation area in operation S1560.

Referring to FIG. 16, when the output mode of the information output apparatus 1000 is the braille information output mode in operation S1610, the information output apparatus 1000 may map braille information to be output to a plurality of expression member in the information output apparatus 1000 in operation S1620.

When the mapping of the braille information is completed, the information output apparatus 1000 may calculate an activation area, as a protrusion actuated position and/or a retraction actuated position of each of a plurality of expression members included in the braille information, and a non-activation area for distinguishing braille letters, as a retraction maintained position of each of a plurality of expression members, in operation S1630. In this embodiment, the non-activation area may include first through third non-activation areas. To distinguish braille columns from each other, the information output apparatus 1000 may calculate, as the first non-activation area, for example, three expression members arranged in three rows and one column between braille columns. To distinguish braille rows from each other, the information output apparatus 1000 may calculate, as the second non-activation area, for example, an expression member arranged in one row and one column between braille rows. To distinguish braille paragraphs from each other, the information output apparatus 1000 may calculate, as the third non-activation area, for example, an array of expression members arranged in two rows and two columns between braille paragraphs.

The information output apparatus 1000 may output the braille information by actuating an expression member to protrude or retract for the activation area and actuating an expression member to retract for each of the first through third non-activation area in operation S1640.

Referring to FIG. 17, when the output mode of the information output apparatus 1000 is the mixed information output mode in operation S1710, the information output apparatus 1000 may divide an information output area into a first display area and a second display area in operation S1720.

When the division of a display area is completed, the information output apparatus 1000 may map image information to be output to a plurality of expression members in the first display area and braille information to a plurality of expression members in the second display area in operation S1730.

When the mapping of the image information and the braille information is completed, the information output apparatus 1000 may calculate a first activation area and a second activation area for the image information and an activation area and a non-activation area for the braille information in operation S1740.

The information output apparatus 1000 may actuate an expression member to protrude for the first activation area and actuate an expression member to retract for the second activation area when outputting the image information to the first display area and may actuate an expression member to protrude or retract for the activation area and maintain an expression member retracted for each of first through fourth non-activation area when outputting the braille information to the second display area in operation S1750. Here, descriptions of the first through fourth non-activation areas are the same as those given in FIGS. 14A and 14B and thus omitted. To separate the first display area from the second display area, the fourth non-activation area may include, for example, an array of expression members arranged in three rows and three columns between the first display area and the second display area.

Figure 18:
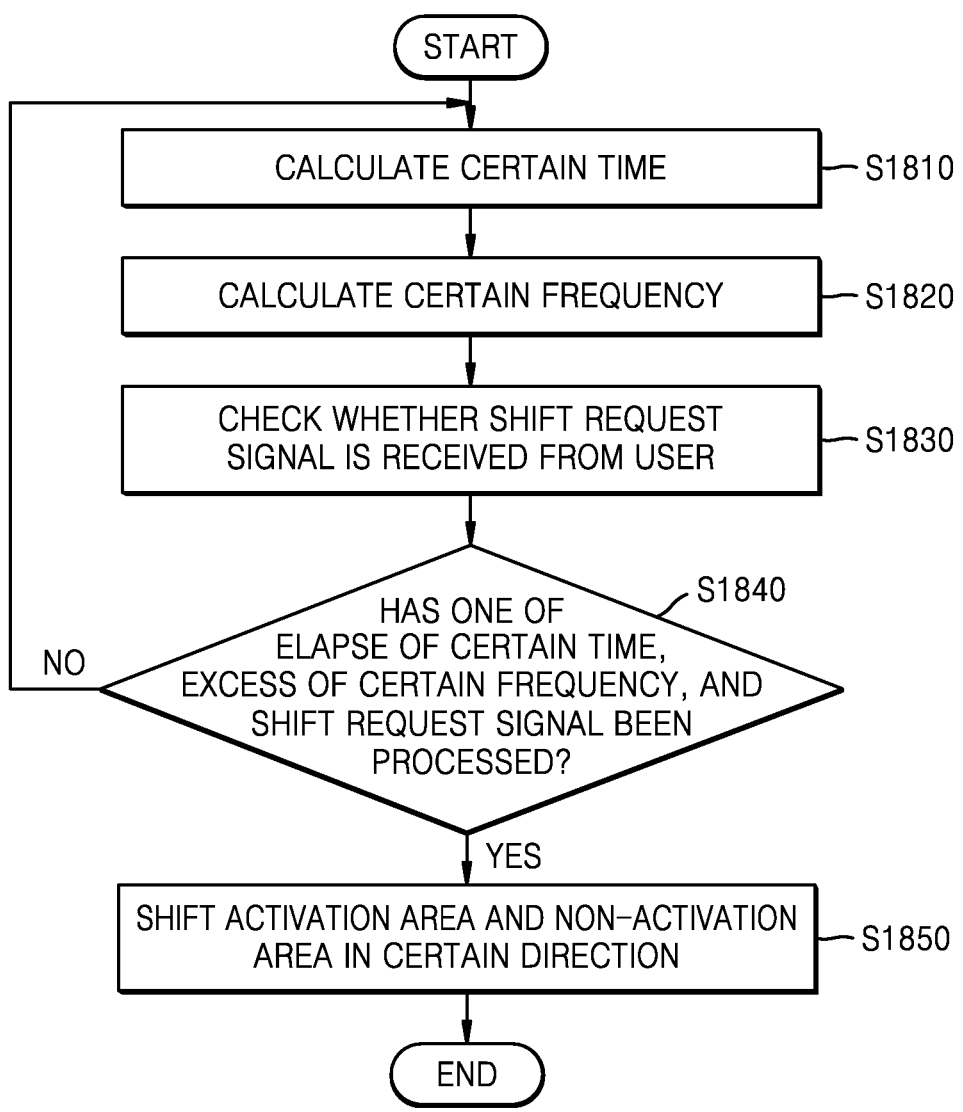
FIG. 18 is a flowchart of a shift method of an information output apparatus, according to an embodiment.

FIG. 18 is a flowchart of a shift method of an information output apparatus, according to an embodiment. Redundant descriptions given in FIGS. 1 through 17 will be omitted below.

The information output apparatus 1000 may calculate a certain time in which an activation area and a non-activation area may be shifted in operation S1810. Here, the calculation of the certain time may include counting and accumulating the certain time, and the certain time may include the first through fourth shift start times described above.

The frequency calculator 720 of the information output apparatus 1000 may calculate a certain frequency at which the activation area and the non-activation area may be shifted in the certain direction in operation S1820. Here, the calculation of the certain frequency may include counting and accumulating the certain frequency, i.e., a certain number. The certain frequency may include a protrusion actuating frequency and a retraction actuating frequency of each actuator in the activation area since the initial operation of the information output apparatus 1000.

The information output apparatus 1000 may check whether a shift request signal for shifting the activation area and the non-activation area in the certain direction is received from a user in operation S1830. Here, the information output apparatus 1000 may receive a shift direction setting signal from the user. When the shift direction setting signal is not received from the user, a programmed shift direction may be set.

The calculation of the certain time (S1810), the calculation of the certain frequency (S1820), and the checking of whether the shift request signal is received (S1830) are sequentially performed in this embodiment but may be simultaneously performed in parallel.

The information output apparatus 1000 may determine whether one of an elapse of the certain time, an excess of the certain frequency, and the user's shift request signal has been processed in operation S1840.

The information output apparatus 1000 may substantially shift the activation area and the non-activation area in the certain direction in response to the elapse of the certain time, the excess of the certain frequency, and the user's shift request signal in operation 51850. Here, the certain direction may include a programmed horizontal direction shifting by at least one column or a programmed vertical direction shifting by at least one row. As described above, the certain direction may further include the number of columns and/or the number of rows, that is, the amount of shift, together with a direction. The certain direction may include a direction in which a previous activation area is converted into a non-activation area after the shift.

An embodiment of the present disclosure can also be embodied as a computer program executed on a computer using various elements. The computer program may be recorded in a computer readable recording medium. Examples of the computer readable recording medium may include magnetic media such as hard disks, floppy disks, and magnetic tapes; optical media such as CD-ROMs and DVDs; magneto-optical media such as floptical disks; and hardware devices such as read-only memory (ROM), random-access memory (RAM), and flash memory that are specially configured to store and execute program commands.

Meanwhile, the computer program may be specially designed and configured for the present disclosure or may have been known to and usable by those skilled in the field of computer software. Examples of the computer program may include machine codes created by a compiler and high-level language codes that can be executed in a computer using an interpreter.

The use of the terms "a" and "an" and "the" and similar referents in the context of describing embodiments (especially in the context of the following claims) are to be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein.

Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of present disclosure unless otherwise claimed. It will be apparent to one of ordinary skill in the art that numerous modifications, combinations, and adaptations can be made according to design conditions and factors without departing from the spirit and scope of the attached claims or their equivalents.

Therefore, the spirit of the present disclosure is not limited to the embodiments described above, and the scope of the appended claims and equivalents to the scope or equivalently changed scopes will be construed as being included in the scope of the spirit of the present disclosure.

The invention claimed is:

1. An information output apparatus comprising:
at least one processor configured to:
calculate a series of braille information as an activation area on a plurality of expression members protruding or retracting by moving in at least one direction and being sensed by a user when protruding or retracting;
calculate a retraction maintained position of at least one expression member, for which retraction is maintained, in at least one selected from the space between braille columns, the space between braille rows, and the space between braille paragraphs as a non-activation area in the activation area; and
control actuation of expression members corresponding to the activation area among the plurality of expression members to protrude or retract and control actuation of expression members corresponding to the non-activation area among the plurality of expression members to retract,
wherein, the non-activation area comprises a first non-activation area, a second non-activation area, a third non-activation area, and a fourth non-activation area,
wherein the first non-activation area includes expression members arranged in between columns of respective braille,
wherein the second non-activation area includes expression members arranged in between rows of respective braille,
wherein the third non-activation area includes expression members arranged in between paragraphs of braille,
wherein the fourth non-activation area, in order to separate an image displayed in the first display area from a braille information displayed in the second display area, includes expression members arranged in between the first display area and the second display area, and
wherein the sizes of the first non-activation area, the second non-activation area, the third non-activation area, and the fourth non-activation area are different.

2. The information output apparatus of claim 1, wherein the at least one processor is further configured to select, as an output object, one of externally received information, information stored in the information output apparatus, and/or information generated in the information output apparatus and configured to output the output object to the plurality of expression members.

3. The information output apparatus of claim 2, wherein the at least one processor is further configured to determine one of first through third information output modes as an output mode for the output object selected by the at least one processor.

4. The information output apparatus of claim 3, wherein the at least one processor is further configured to map the output object corresponding to the output mode determined by the at least one processor to the plurality of expression members.

5. The information output apparatus of claim 4, wherein the at least one processor is further configured to respectively actuate the plurality of expression members to protrude or retract under control of the at least one processor.

6. An information output method, the method being performed by at least one processor executing instructions stored in a memory, the method comprising:
calculating a series of braille information as an activation area on a plurality of expression members protruding or retracting by moving in at least one direction and being sensed by a user when protruding or retracting;
calculating a retraction maintained position of at least one expression member, for which retraction is maintained, in at least one selected from the space between braille columns, the space between braille rows, and the space between braille paragraphs as a non-activation area in the activation area; and
controlling actuation of expression members corresponding to the activation area among the plurality of expression members to protrude or retract and controlling actuation of expression members corresponding to the non-activation area among the plurality of expression members to retract,
wherein, the non-activation area comprises a first non-activation area, a second non- activation area, a third non-activation area, and a fourth non-activation area,
wherein the first non-activation area includes expression members arranged in between columns of respective braille,
wherein the second non-activation area includes expression members arranged in between rows of respective braille,
wherein the third non-activation area includes expression members arranged in between paragraphs of braille,
wherein the fourth non-activation area, in order to separate an image displayed in the first display area from a braille information displayed in the second display area, includes expression members arranged in between the first display area and the second display area, and
wherein the sizes of the first non-activation area, the second non-activation area, the third non-activation area, and the fourth non-activation area are different.

7. The information output method of claim 6, further comprising selecting, as an output object, one of externally received information, information stored in an information output apparatus, and/or information generated in the information output apparatus and outputting the output object to the plurality of expression members.

8. The information output method of claim 7, further comprising determining one of first through third information output modes as an output mode for the output object selected by the at least one processor.

9. The information output method of claim 8, further comprising mapping the output object corresponding to the output mode determined by the at least one processor to the plurality of expression members.

10. A non-transitory computer-readable recording medium having recorded thereon a computer program for executing the method of claim 6.

11. A non-transitory computer-readable recording medium having recorded thereon a computer program for executing the method of claim 7.

12. A non-transitory computer-readable recording medium having recorded thereon a computer program for executing the method of claim 8.

13. A non-transitory computer-readable recording medium having recorded thereon a computer program for executing the method of claim 9.

* * * * *